(12) United States Patent
Endoh et al.

(10) Patent No.: US 8,507,841 B2
(45) Date of Patent: Aug. 13, 2013

(54) OPTICAL ELEMENT AND METHOD FOR PRODUCING THE SAME

(75) Inventors: Sohmei Endoh, Miyagi (JP); Kazuya Hayashibe, Miyagi (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 12/862,249

(22) Filed: Aug. 24, 2010

(65) Prior Publication Data

US 2011/0051251 A1    Mar. 3, 2011

(30) Foreign Application Priority Data

Sep. 2, 2009    (JP) ................................ P2009-203178

(51) Int. Cl.
*G02B 5/00*    (2006.01)

(52) U.S. Cl.
USPC .................. 250/216; 250/237 R; 250/231.13; 359/896; 216/24; 216/41

(58) Field of Classification Search
USPC ...................... 250/216, 237 R, 237 G, 231.13, 250/231.14; 359/558, 601, 894, 896; 216/24, 216/41

See application file for complete search history.

(56) References Cited

U.S. PATENT DOCUMENTS

| | | | | |
|---|---|---|---|---|
| 7,633,045 | B2 * | 12/2009 | Endoh et al. ................... | 250/216 |
| 2002/0135847 | A1 | 9/2002 | Nagasaka et al. | |
| 2003/0011315 | A1 | 1/2003 | Ito et al. | |
| 2005/0074576 | A1 | 4/2005 | Chaiken et al. | |
| 2008/0107868 | A1 | 5/2008 | Kuroda et al. | |
| 2008/0304155 | A1 | 12/2008 | Endoh et al. | |
| 2009/0257127 | A1 | 10/2009 | Okayama et al. | |

FOREIGN PATENT DOCUMENTS

| | | |
|---|---|---|
| EP | 2056129 A1 | 5/2009 |
| JP | 2003-004916 | 1/2003 |
| JP | 2003-131390 | 5/2003 |
| JP | 2003-240904 | 8/2003 |
| JP | 2003-294910 | 10/2003 |
| JP | 2003-322705 | 11/2003 |
| JP | 2004-317922 | 11/2004 |
| JP | 2005-031538 | 2/2005 |
| JP | 2006-038928 | 2/2006 |
| JP | 2006-293093 | 10/2006 |
| WO | 2007/018149 A1 | 2/2007 |

OTHER PUBLICATIONS

European Search Report dated Nov. 29, 2010, for corresponding European Patent Appln. No. 10008302.1.

\* cited by examiner

*Primary Examiner* — Kevin Pyo
(74) *Attorney, Agent, or Firm* — K&L Gates LLP

(57) ABSTRACT

An optical element having an anti-reflection function includes a base having a first main surface and a second main surface; a plurality of structures composed of projections or recesses and arranged on the first main surface at a fine pitch equal to or less than the wavelength of visible light for which the amount of reflection is to be reduced; and a light-absorbing layer that absorbs the light and that is disposed on the second main surface, wherein the structures are arranged so as to form a plurality of rows of tracks on the first main surface and form a hexagonal lattice pattern, a quasi-hexagonal lattice pattern, a tetragonal lattice pattern, or a quasi-tetragonal lattice pattern, and the structures each have an elliptical cone shape or a truncated elliptical cone shape, the major axis direction of which is a direction in which the tracks extend.

11 Claims, 30 Drawing Sheets

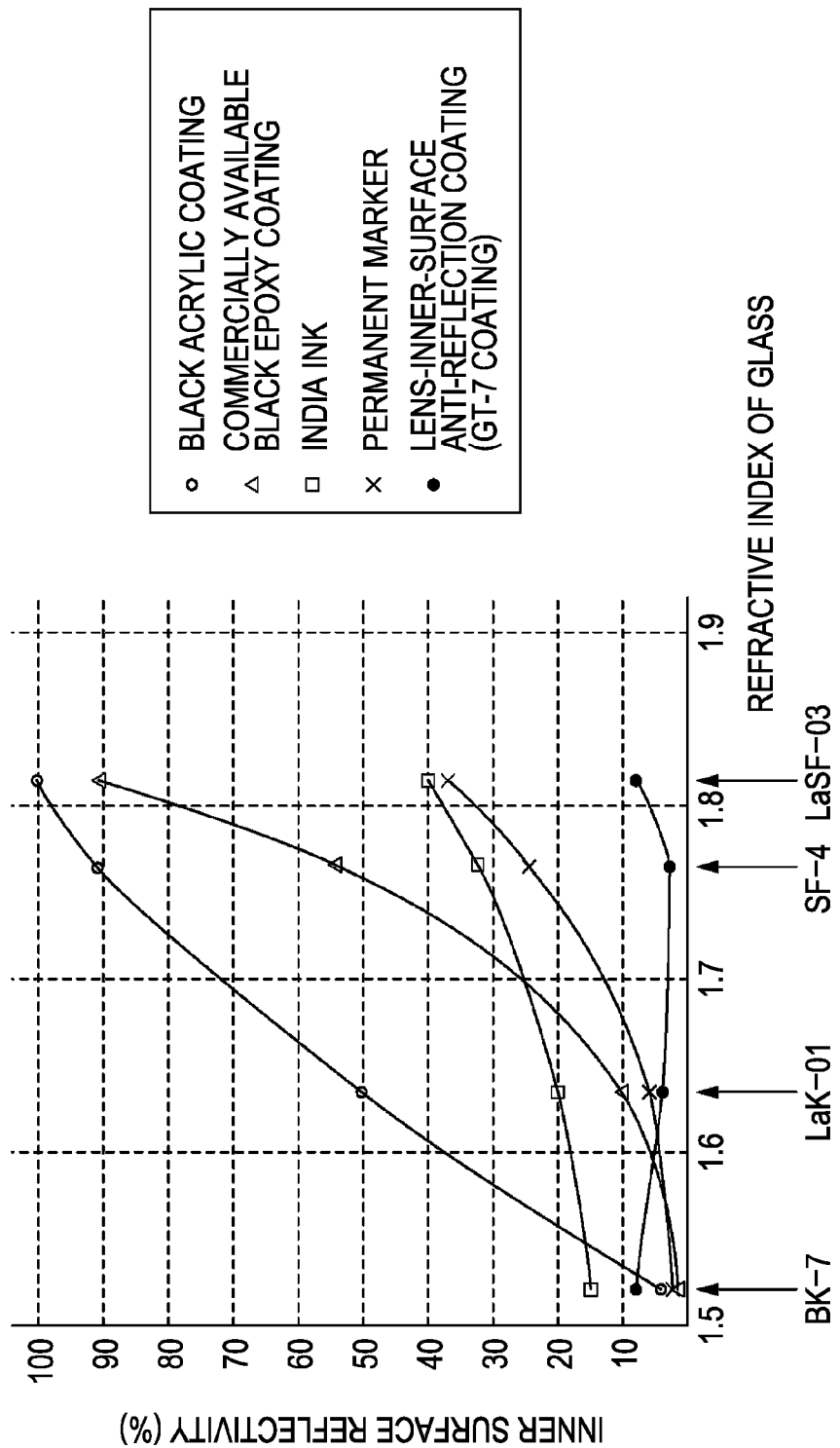

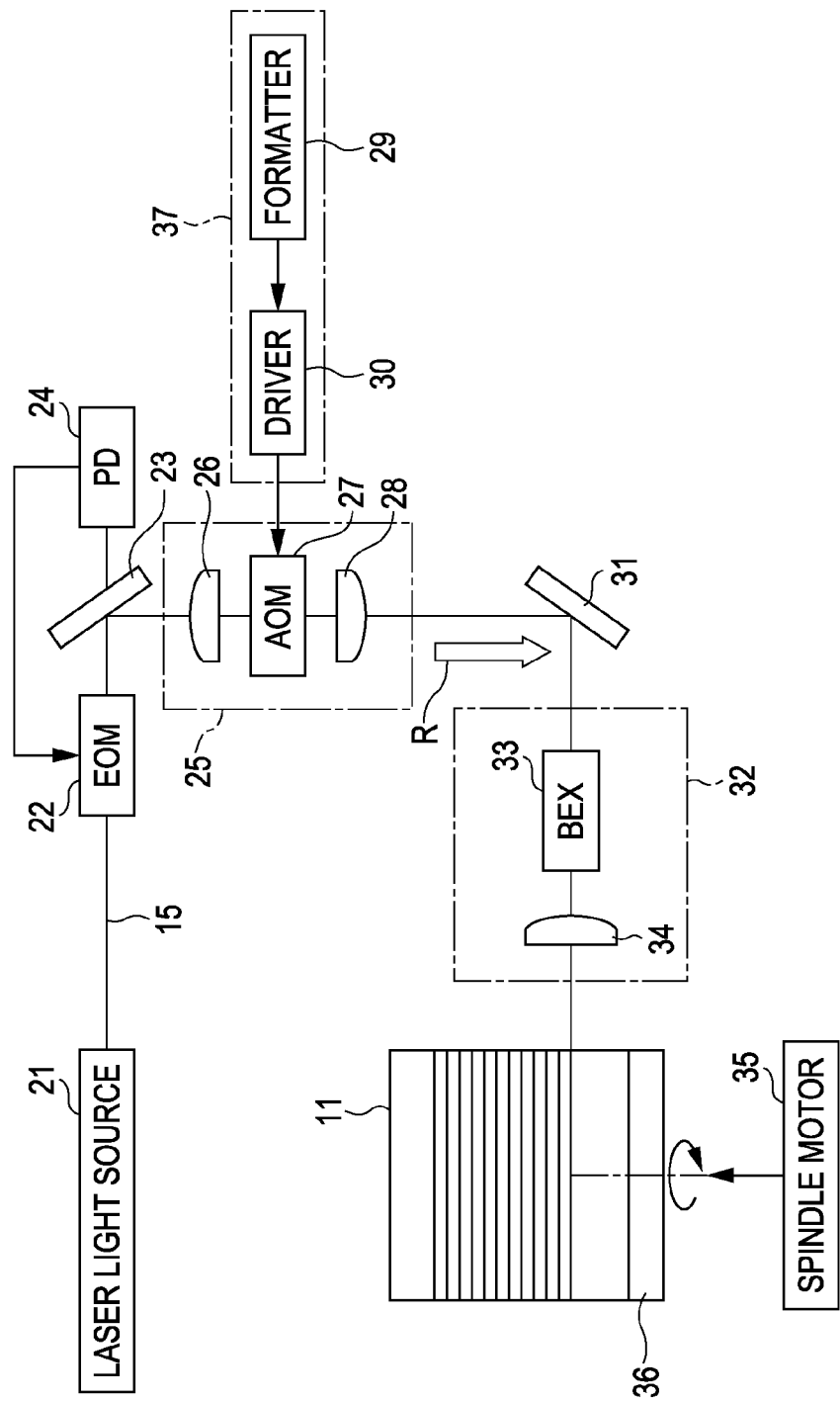

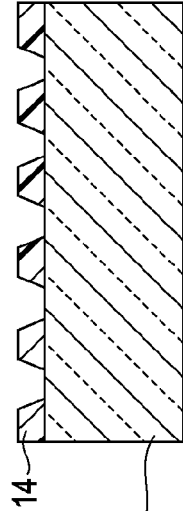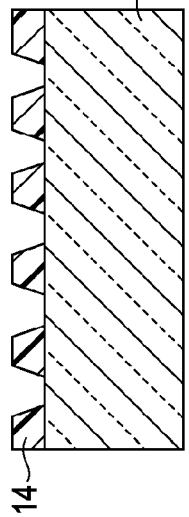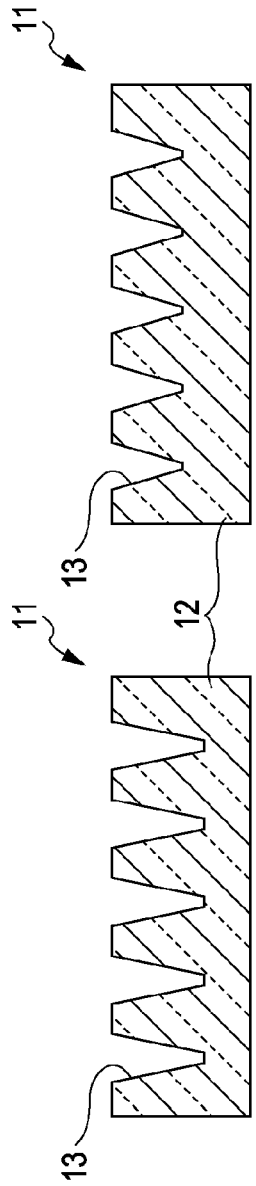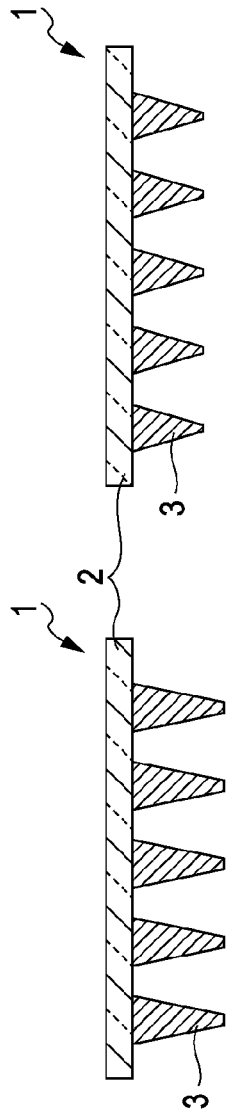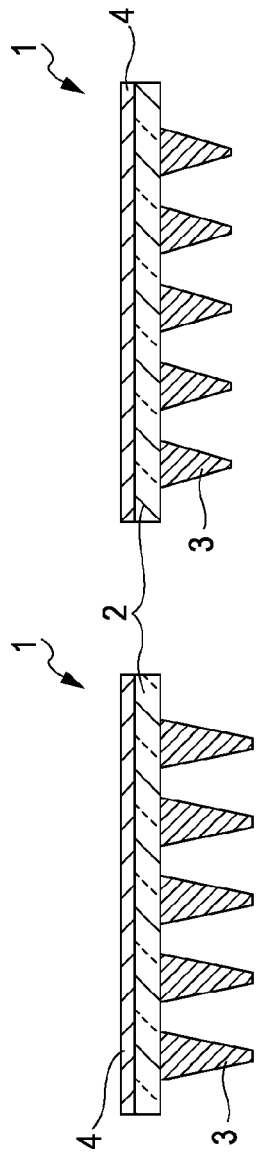

OPTICAL ELEMENT AND METHOD FOR PRODUCING THE SAME

CROSS REFERENCES TO RELATED APPLICATIONS

The present application claims priority to Japanese Priority Patent Application JP 2009-203178 filed in the Japan Patent Office on Sep. 2, 2009, the entire content of which is hereby incorporated by reference.

BACKGROUND

The present application relates to an optical element and a method for producing the same. More specifically, the present application relates to an optical element in which a large number of structures are arranged at a fine pitch equal to or less than the wavelength of light for which the amount of reflection is to be reduced.

As shown in FIG. 1, in a lens barrel 101 of an optical instrument such as a camera or a telescope, external light L1 incident from a lens 102 is diffusely reflected at end faces of the lens 102 and a lens 103. Since diffusely reflected light components L2 generated at the end faces travel to behind the lenses 102 and 103, ghosts and flare are caused in an image, resulting in a decrease in the contrast, for example. Consequently, techniques have been used practically, in which a coating is applied onto a surface of a component provided in a lens barrel of an optical instrument such as a camera or a telescope so that the amount of light reflected at the surface of the component provided in the lens barrel is decreased to increase the contrast.

A coating material (produced by LOSIMOL GmbH, Germany, trade name: GT series) that employs ultrafine particles composed of a highly refractive material is widely known as a lens-inner-surface anti-reflection coating used for the inside of a lens barrel (refer to LOSIMOL GmbH, Germany, sole import agency Prince-boueki KK, "Lens-inner-surface anti-reflection coating, GT series". In order to realize a high optical performance, not only a coating treatment performed on a lens but also a process of light reflected inside a lens barrel in a complex manner is an important point. To suppress the generation of ghosts and flare, it is important to reduce the amount of diffusely reflected light, as described above.

By applying the above lens-inner-surface anti-reflection coating onto a fitting surface or an inclined surface that holds a lens, the amount of reflected light traveling from a lens barrel to the outside or the amount of reflected light traveling into the lens barrel is decreased. The lens-inner-surface anti-reflection coating contains ultrafine particles composed of a highly refractive material. The refractive index of the ultrafine particles is higher than that of glass, and a significant effect of suppressing reflection can be achieved. An excellent anti-reflection effect can be obtained by appropriately selecting the type of lens-inner-surface anti-reflection coating (GT series) used in accordance with the position and the purpose of the application.

According to the above lens-inner-surface anti-reflection coating, a uniform light absorber can be formed because a dye, the particles of which are dispersed on the molecular level, is used. A sufficient effect can be also achieved in preventing inner-surface reflection in highly-refractive glass, which is difficult using a coating that employs a component composed of large particles. FIG. 2 shows measurement results of the above lens-inner-surface anti-reflection coating. Referring to FIG. 2, the inner surface reflectivity is decreased to several percent or less by applying the lens-inner-surface anti-reflection coating.

Furthermore, as a coating material for the purpose of preventing reflection, a graphite coating material (produced by Sanesu Junkatsu Inc., trade name: San coat GR) is known (refer to Sanesu Junkatsu Inc. "Features of San coat GR # series (graphite coating material)". In this coating material, adjustment ranging from glossy black to completely matt black can be realized.

Furthermore, in displays used in personal computers, car navigation systems, touch panels, and the like, a film on which an anti-reflection or anti-glare treatment has been performed is used in order to prevent reflection of a fluorescent lamp, illumination light, and the like (refer to, for example, Tokushiki Co., Ltd. "Hybrid technology, coating agent, anti-glare coating agent". The anti-reflection treatment is a technique in which a path of light is adjusted and reflection is suppressed by utilizing a difference in refractive index. The anti-glare treatment is a technique in which light is diffusely reflected by forming projections and recesses on a surface to eliminate glare. For example, the above-mentioned "Hybrid technology, coating agent, anti-glare coating agent" (Tokushiki Co., Ltd. discloses a coating agent for anti-glare films using a dispersion technique of fillers.

As a technique other than the coating techniques described above, a technique in which an anti-reflection structure is formed in a lens barrel of an optical instrument such as a camera or a telescope is known (refer to, for example, Japanese Unexamined Patent Application Publication No. 2006-293093).

FIG. 3A is a schematic view showing an arrangement of a zoom lens system included in a lens barrel. This zoom lens system is a lens system in which zooming is performed by moving a plurality of lens groups in an optical axis direction. This zoom lens system includes a first lens group G1 located at a position closest to an object, a second lens group G2 that is located at a position second closest to the object and that has a power different from that of the first lens group G1, and a third lens group G3 located at a position third closest to the object. A plurality of anti-reflection structures 111 are provided on a portion of the inner surface of a lens barrel, the portion corresponding to a range from the first lens group G1 to a position on the imaging surface S side. The anti-reflection structures 111 are periodically arranged in the form of an array at a pitch smaller than the shortest wavelength of incident light. Since the anti-reflection structures 111 are provided on the inner surface of the lens barrel in this manner, reflection of off-axis light in the lens barrel, the off-axis light being incident on the lens groups, can be suppressed. Thus, a lens barrel in which degradation of image quality due to unnecessary light is suppressed can be provided.

FIG. 3B is a schematic enlarged view of the second lens group G2 of the lens barrel. As described above, in the second lens group G2, a positive lens 112 and a positive lens 113 are disposed with a certain distance therebetween. Accordingly, off-axis light that does not contribute to the formation of an object passes through the first lens group G1, is incident on the second lens group G2, and then reaches a portion of the inner circumferential surface of the lens barrel, the portion corresponding to the above certain distance. When the off-axis light reaches and is reflected from the inner circumferential surface of the lens barrel, the reflected light becomes stray light and reaches the imaging surface S, thus causing flare and ghosts. To prevent this problem, as shown in FIG. 3B, in the second lens group G2 of the lens barrel, the anti-reflection structures 111 are provided on the portion of the inner circumferential surface of the lens barrel, the portion corresponding to the above certain distance.

Here, the anti-reflection structures 111 are composed of structural units each having a certain shape and periodically arranged in the form of an array at a pitch smaller than the lower limit of the wavelength of incident light, that is, at a pitch smaller than the shortest wavelength of the incident light. By periodically arranging the structural units each having a certain shape in the form of an array in this manner, the refractive index to incident light is apparently continuously changed to form an anti-reflection functional surface in which the incident angle dependence and the wavelength dependence of transmission/reflection characteristics at the interface with an air layer are small. As for an example of the anti-reflection structures 111, as shown in FIG. 3C, circular-cone-shaped projections each having a height H are used as the structural units, and these circular-cone-shaped projections are periodically arranged in the form of an array at a pitch P.

SUMMARY

In the above-described techniques in which an anti-reflection coating is performed on a component provided in a lens barrel of an optical instrument such as a camera or a telescope, the reflectivity is in the range of about 1% to 5%, and it is difficult to achieve a sufficient anti-reflection effect. In particular, the reflectivity of oblique incidence is high, and thus it is difficult to sufficiently prevent stray light in the lens barrel, resulting in degradation of the contrast.

Also in the above-described technique in which anti-reflection structures are provided on a component provided in a lens barrel of an optical instrument such as a camera or a telescope, it is difficult to achieve a sufficient anti-reflection effect.

It is desirable to provide an optical element having a good anti-reflection effect and a method for producing the same.

According to an embodiment, there is provided an optical element having an anti-reflection function, the optical element including a base having a first main surface and a second main surface, a plurality of structures composed of projections or recesses and arranged on the first main surface at a fine pitch equal to or less than the wavelength of visible light for which the amount of reflection is to be reduced, and a light-absorbing layer that absorbs the light and that is disposed on the second main surface, wherein the structures are arranged so as to form a plurality of rows of tracks on the first main surface of the base and form a hexagonal lattice pattern, a quasi-hexagonal lattice pattern, a tetragonal lattice pattern, or a quasi-tetragonal lattice pattern, and the structures each have an elliptical cone shape or a truncated elliptical cone shape, the major axis direction of which is a direction in which the tracks extend.

According to an embodiment, there is provided an optical element having an anti-reflection function, the optical element including a base having a first main surface and a second main surface, a plurality of structures composed of projections or recesses and arranged on the first main surface at a fine pitch equal to or less than the wavelength of visible light for which the amount of reflection is to be reduced, and a light-absorbing layer that absorbs the light and that is disposed on the second main surface, wherein the structures are arranged so as to form a plurality of rows of tracks on the first main surface and form a hexagonal lattice pattern, a quasi-hexagonal lattice pattern, a tetragonal lattice pattern, or a quasi-tetragonal lattice pattern, and a filling factor of the structures to the first main surface of the base is 65% or more.

According to an embodiment, there is provided an optical element having an anti-reflection function, the optical element including a base having a first main surface and a second main surface, a plurality of structures composed of projections or recesses and arranged on the first main surface at a fine pitch equal to or less than the wavelength of visible light for which the amount of reflection is to be reduced, and a light-absorbing layer that absorbs the light and that is disposed on the second main surface, wherein the structures are arranged so as to form a plurality of rows of tracks on the first main surface and form a quasi-hexagonal lattice pattern, and when an arrangement pitch of the structures in the same track is represented by P1 and the diameter of the bottom surface of each of the structures in a direction in which the tracks extend is represented by $2r$, the ratio $((2r/P1)\times100)$ of the diameter $2r$ to the arrangement pitch P1 is 85% or more.

According to an embodiment, there is provided an optical element having an anti-reflection function, the optical element including a base having a first main surface and a second main surface, a plurality of structures composed of projections or recesses and arranged on the first main surface at a fine pitch equal to or less than the wavelength of visible light for which the amount of reflection is to be reduced, and a light-absorbing layer that absorbs the light and that is disposed on the second main surface, wherein the structures are arranged so as to form a plurality of rows of tracks on the first main surface and form a tetragonal lattice pattern or a quasi-tetragonal lattice pattern, and when an arrangement pitch of the structures in the same track is represented by P1 and the diameter of the bottom surface of each of the structures in a direction in which the tracks extend is represented by $2r$, the ratio $((2r/P1)\times100)$ of the diameter $2r$ to the arrangement pitch P1 is 64% or more.

According to an embodiment, there is provided an optical element having an anti-reflection function, the optical element including a base having a first main surface and a second main surface, and a plurality of structures composed of projections or recesses and arranged on the first main surface at a fine pitch equal to or less than the wavelength of visible light for which the amount of reflection is to be reduced, wherein the base and/or the structures have a property of absorbing the light, the structures are arranged so as to form a plurality of rows of tracks on the first main surface and form a hexagonal lattice pattern, a quasi-hexagonal lattice pattern, a tetragonal lattice pattern, or a quasi-tetragonal lattice pattern, and the structures each have an elliptical cone shape or a truncated elliptical cone shape, the major axis direction of which is a direction in which the tracks extend.

According to an embodiment, there is provided an optical element having an anti-reflection function, the optical element including a base having a first main surface and a second main surface, and a plurality of structures composed of projections or recesses and arranged on the first main surface at a fine pitch equal to or less than the wavelength of visible light for which the amount of reflection is to be reduced, wherein the base and/or the structures have a property of absorbing the light, the structures are arranged so as to form a plurality of rows of tracks on the first main surface and form a hexagonal lattice pattern, a quasi-hexagonal lattice pattern, a tetragonal lattice pattern, or a quasi-tetragonal lattice pattern, and a filling factor of the structures to the first main surface of the base is 65% or more.

According to an embodiment, there is provided an optical element having an anti-reflection function, the optical element including a base having a first main surface and a second main surface, and a plurality of structures composed of projections or recesses and arranged on the first main surface at a fine pitch equal to or less than the wavelength of visible light for which the amount of reflection is to be reduced, wherein the base and/or the structures have a property of absorbing the light, the structures are arranged so as to form a plurality of rows of tracks on the first main surface and form a quasi-hexagonal lattice pattern, and when an arrangement pitch of the structures in the same track is represented by P1 and the diameter of the bottom surface of each of the structures in a direction in which the tracks extend is represented by 2r, the ratio (($2r$/P1)×100) of the diameter $2r$ to the arrangement pitch P1 is 85% or more.

According to an embodiment, there is provided an optical element having an anti-reflection function, the optical element including a base having a first main surface and a second main surface, and a plurality of structures composed of projections or recesses and arranged on the first main surface at a fine pitch equal to or less than the wavelength of visible light for which the amount of reflection is to be reduced, wherein the base and/or the structures have a property of absorbing the light, the structures are arranged so as to form a plurality of rows of tracks on the first main surface and form a tetragonal lattice pattern or a quasi-tetragonal lattice pattern, and when an arrangement pitch of the structures in the same track is represented by P1 and the diameter of the bottom surface of each of the structures in a direction in which the tracks extend is represented by $2r$, the ratio (($2r$/P1)×100) of the diameter $2r$ to the arrangement pitch P1 is 64% or more.

According to an embodiment, there is provided a method for producing an optical element having an anti-reflection function, the method including the steps of forming a resist layer on a surface of a columnar or cylindrical master, forming latent images at a pitch equal to or less than the wavelength of visible light, for which the amount of reflection is to be reduced, by intermittently irradiating the resist layer with a laser beam while the master having the resist layer thereon is rotated and a spot of the laser beam is relatively moved in parallel with a central axis of the columnar or cylindrical master, forming a resist pattern on the surface of the master by developing the resist layer, forming recessed or projecting structures on the surface of the master by performing an etching treatment using the resist pattern as a mask, preparing an optical element in which the structures are transferred to a first main surface of the optical element using the master having the structures thereon, and forming a light-absorbing layer on a second main surface of the optical element, the light-absorbing layer being configured to absorb the light for which the amount of reflection is to be reduced, wherein, in the step of forming the latent images, the latent images are arranged so as to form a plurality of rows of tracks on the surface of the master and form a hexagonal lattice pattern, a quasi-hexagonal lattice pattern, a tetragonal lattice pattern, or a quasi-tetragonal lattice pattern, and the latent images each have an elliptical shape, the major axis direction of which is a direction in which the tracks extend.

According to an embodiment, there is provided a method for producing an optical element having an anti-reflection function, the method including the steps of forming a resist layer on a surface of a master, forming latent images at a pitch equal to or less than the wavelength of visible light, for which the amount of reflection is to be reduced, by intermittently irradiating the resist layer with a laser beam while the master having the resist layer thereon is rotated and a spot of the laser beam is relatively moved in a radial direction of the rotation of the master, forming a resist pattern on the surface of the master by developing the resist layer, forming recessed or projecting structures on the surface of the master by performing an etching treatment using the resist pattern as a mask, preparing an optical element in which the structures are transferred to a first main surface of the optical element using the master having the structures thereon, and forming a light-absorbing layer on a second main surface of the optical element, the light-absorbing layer being configured to absorb the light for which the amount of reflection is to be reduced, wherein, in the step of forming the latent images, the latent images are arranged so as to form a plurality of rows of tracks on the surface of the master and form a hexagonal lattice pattern, a quasi-hexagonal lattice pattern, a tetragonal lattice pattern, or a quasi-tetragonal lattice pattern, and the latent images each have an elliptical shape, the major axis direction of which is a direction in which the tracks extend.

In an embodiment, the structures are preferably periodically arranged in a tetragonal lattice pattern or a quasi-tetragonal lattice pattern. Herein, the term "tetragonal lattice" refers to a regular tetragonal lattice. The term "quasi-tetragonal lattice" refers to a distorted regular tetragonal lattice unlike the regular tetragonal lattice.

For example, when the structures are arranged on a straight line, the quasi-tetragonal lattice refers to a tetragonal lattice that is distorted by stretching a regular tetragonal lattice in a linear arrangement direction (track direction). When the structures are arranged in a meandering manner, the quasi-tetragonal lattice refers to a tetragonal lattice obtained by distorting a regular tetragonal lattice along the meandering arrangement of the structures. Alternatively, the quasi-tetragonal lattice refers to a tetragonal lattice that is distorted by stretching a regular tetragonal lattice in a linear arrangement direction (track direction), and in addition, that is distorted along a meandering arrangement of the structures.

In an embodiment, the structures are preferably periodically arranged in a hexagonal lattice pattern or a quasi-hexagonal lattice pattern. Herein, the term "hexagonal lattice" refers to a regular hexagonal lattice. The term "quasi-hexagonal lattice" refers to a distorted regular hexagonal lattice unlike the regular hexagonal lattice.

For example, when the structures are arranged on a straight line, the quasi-hexagonal lattice refers to a hexagonal lattice that is distorted by stretching a regular hexagonal lattice in a linear arrangement direction (track direction). When the structures are arranged in a meandering manner, the quasi-hexagonal lattice refers to a hexagonal lattice obtained by distorting a regular hexagonal lattice along the meandering arrangement of the structures. Alternatively, the quasi-hexagonal lattice refers to a hexagonal lattice that is distorted by stretching a regular hexagonal lattice in a linear arrangement direction (track direction), and in addition, that is distorted along a meandering arrangement of the structures.

In an embodiment, the term "ellipse" includes not only a perfect ellipse that is mathematically defined but also a somewhat distorted ellipse. The term "circle" includes not only a perfect circle (true circle) that is mathematically defined but also a somewhat distorted circle.

In an embodiment, an arrangement pitch P1 of the structures in the same track is preferably longer than an arrangement pitch P2 of the structures between two adjacent tracks. In this case, since the filling factor of the structures each having an elliptical cone shape or a truncated elliptical cone shape can be improved, anti-reflection characteristics can be improved.

In an embodiment, in the case where the structures form a hexagonal lattice pattern or a quasi-hexagonal lattice pattern on the first main surface of the base, when an arrangement pitch of the structures in the same track is represented by P1 and an arrangement pitch of the structures between two adjacent tracks is represented by P2, the ratio P1/P2 preferably satisfies the relationship $1.00 \leq P1/P2 \leq 1.1$ or $1.00 < P1/P2 \leq 1.1$. By controlling the ratio to be within this numerical range, the filling factor of the structures each having an elliptical cone shape or a truncated elliptical cone shape can be improved and thus anti-reflection characteristics can be improved.

In an embodiment, when the structures form a hexagonal lattice pattern or a quasi-hexagonal lattice pattern on the first main surface of the base, the structures each preferably have an elliptical cone shape or truncated elliptical cone shape, the major axis direction of which is a direction in which the tracks extend, and in which the slope of a central portion is steeper than the slopes of a top portion and a bottom portion. With such a shape, anti-reflection characteristics and transmission characteristics can be improved.

In an embodiment, when the structures form a hexagonal lattice pattern or a quasi-hexagonal lattice pattern on the first main surface of the base, a height or a depth of each of the structures in the direction in which the tracks extend is preferably smaller than a height or a depth of each of the structures in a row direction of the tracks. When this relationship is not satisfied, it is necessary that the arrangement pitch in the direction in which the tracks extend be made to be long and thus the filling factor of the structures in the direction in which the tracks extend decreases. Such a decrease in the filling factor may result in a decrease in reflection characteristics.

In an embodiment, when the structures form a tetragonal lattice pattern or a quasi-tetragonal lattice pattern on the first main surface of the base, an arrangement pitch P1 of the structures in the same track is preferably longer than an arrangement pitch P2 of the structures between two adjacent tracks. In this case, since the filling factor of the structures each having an elliptical cone shape or a truncated elliptical cone shape can be improved, anti-reflection characteristics can be improved.

In an embodiment, in the case where the structures form a tetragonal lattice pattern or a quasi-tetragonal lattice pattern on the first main surface of the base, when an arrangement pitch of the structures in the same track is represented by P1 and an arrangement pitch of the structures between two adjacent tracks is represented by P2, the ratio P1/P2 preferably satisfies the relationship $1.4 < P1/P2 \leq 1.5$. By controlling the ratio to be within this numerical range, the filling factor of the structures each having an elliptical cone shape or a truncated elliptical cone shape can be improved and thus anti-reflection characteristics can be improved.

In an embodiment, when the structures form a tetragonal lattice pattern or a quasi-tetragonal lattice pattern on the first main surface of the base, the structures each preferably have an elliptical cone shape or truncated elliptical cone shape, the major axis direction of which is a direction in which the tracks extend, and in which the slope of a central portion is steeper than the slopes of a top portion and a bottom portion. With such a shape, anti-reflection characteristics and transmission characteristics can be improved.

In an embodiment, when the structures form a tetragonal lattice pattern or a quasi-tetragonal lattice pattern on the first main surface of the base, a height or a depth of each of the structures in a direction of 45 degrees or about 45 degrees with respect to the tracks is preferably smaller than a height or a depth of each of the structures in a row direction of the tracks. When this relationship is not satisfied, it is necessary that the arrangement pitch in the direction of 45 degrees or about 45 degrees with respect to the tracks be made to be long and thus the filling factor of the structures in the direction of 45 degrees or about 45 degrees with respect to the tracks decreases. Such a decrease in the filling factor may result in a decrease in reflection characteristics.

In an embodiment, a large number of structures arranged on a first main surface (front surface) of a base at a fine pitch form a plurality of rows of tracks, and form a hexagonal lattice pattern, a quasi-hexagonal lattice pattern, a tetragonal lattice pattern, or a quasi-tetragonal lattice pattern in three adjacent tracks. Accordingly, the filling density of the structures on the first main surface (front surface) can be increased. Thus, the efficiency of preventing reflection of light such as visible light is increased, and an optical element having good anti-reflection characteristics and a high transmittance can be obtained. Furthermore, since a light-absorbing layer is formed on a second main surface (back surface) of the base, the back-surface reflection on the optical element can be suppressed.

When an optical element is prepared by a method in which a process for preparing a master of an optical disk is combined with an etching process, a master for preparing an optical element can be efficiently produced in a short time and an increase in the size of a base can also be realized. Accordingly, productivity of the optical element can be improved. Furthermore, when a fine arrangement of the structures is provided not only on a light incident surface but also on a light-emitting surface, transmission characteristics can be further improved.

As described above, according to an embodiment, an optical element having a good anti-reflection effect can be obtained. When a component provided in a lens barrel of an optical instrument includes this optical element, reflection of light in the component provided in the lens barrel of the optical instrument can be suppressed. Accordingly, optical characteristics of the optical instrument can be improved.

Additional features and advantages are described herein, and will be apparent from the following Detailed Description and the figures.

BRIEF DESCRIPTION OF THE FIGURES

FIG. 2 is a graph showing the inner surface reflectivity of a lens-inner-surface anti-reflection coating in the related art;

in FIG. 4B;

in FIG. 4B;

FIG. 14 is a schematic diagram showing an example of a configuration of a roll master exposure apparatus;

FIGS. 16A to 16D are process views illustrating the method for producing the optical element according to the first embodiment;

in FIG. 17B;

in FIG. 17B;

in FIG. 20B;

in FIG. 20B;

in FIG. 24B;

in FIG. 24B;

DETAILED DESCRIPTION

The present application will now be described with reference to the drawings according to an embodiment.

First Embodiment (An example in which structures are two-dimensionally arranged in a straight line and in a hexagonal lattice pattern: refer to FIGS. 4A to 4F)

[Configuration of Optical Element]

Figure 1:
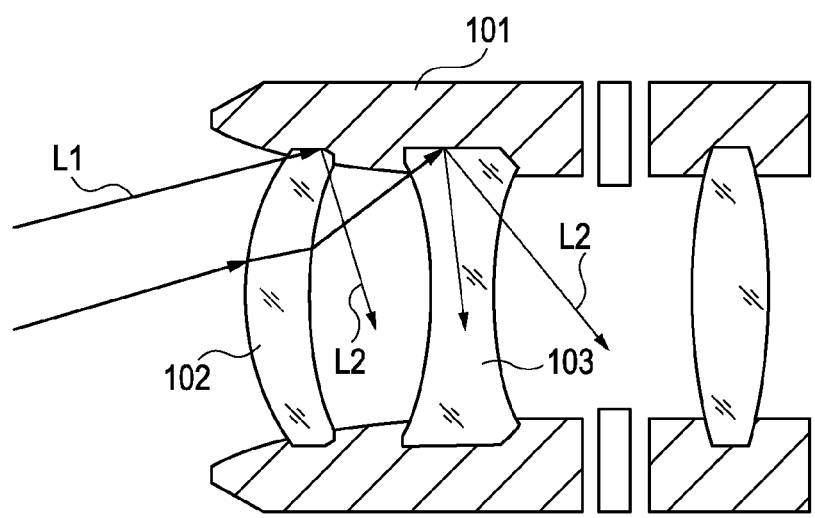
FIG. 1 is a schematic view showing a configuration of a lens barrel of an optical instrument in the related art.
Figure 3A:
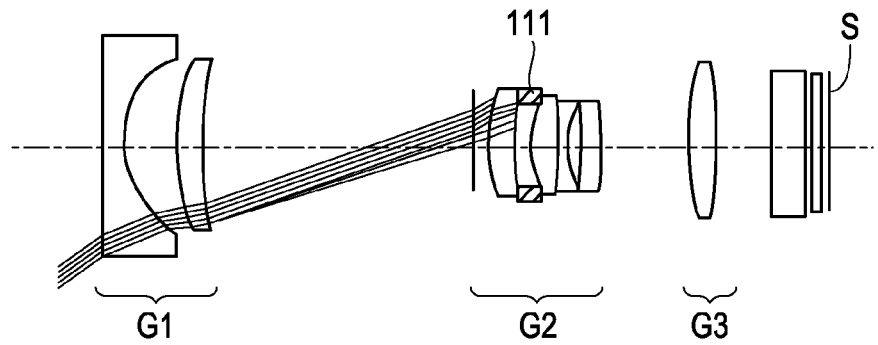
FIG. 3A is a schematic view showing an arrangement of a zoom lens system included in a lens barrel.
Figure 3B:
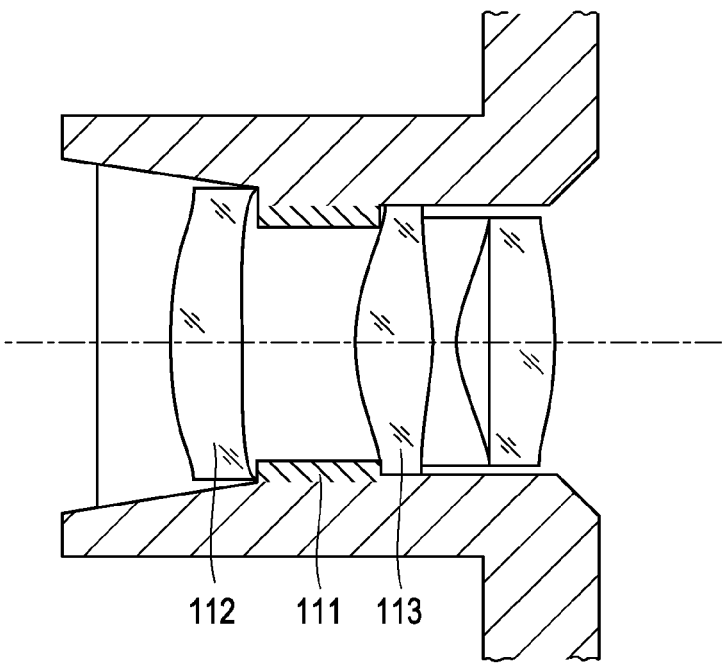
FIG. 3B is a schematic enlarged view of a second lens group of the lens barrel.
Figure 3C:
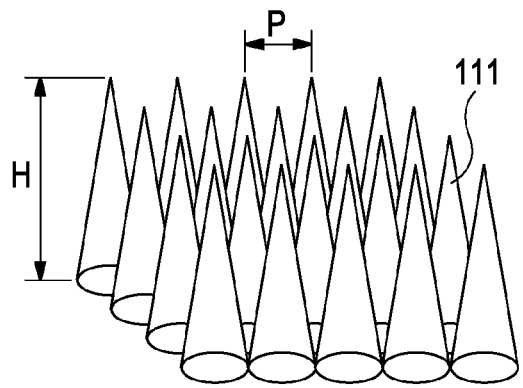
FIG. 3C is a schematic view showing the shape and arrangement of anti-reflection structures.
Figure 4A:
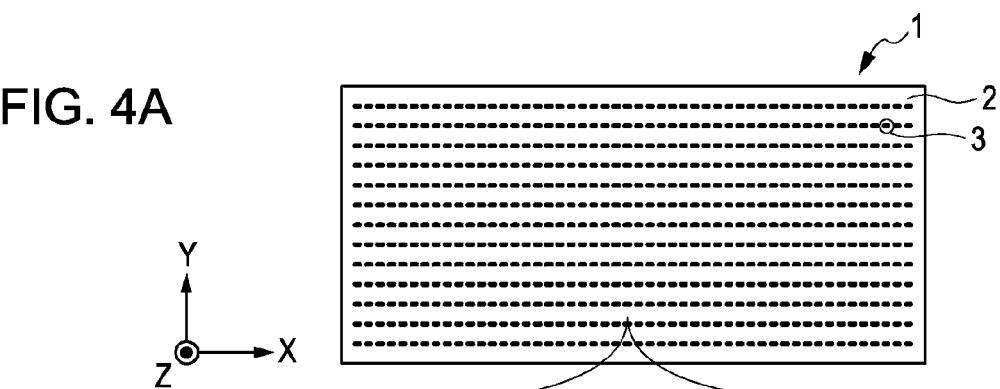
FIG. 4A is a schematic plan view showing an example of a configuration of an optical element according to a first embodiment.
Figure 4B:
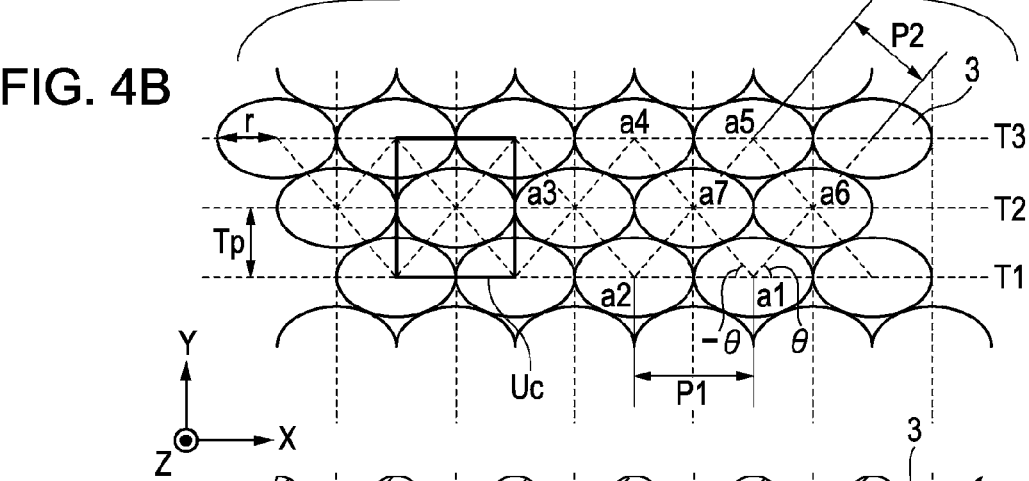
FIG. 4B is an enlarged plan view showing a part of the optical element shown in FIG. 4A.
Figure 4C:
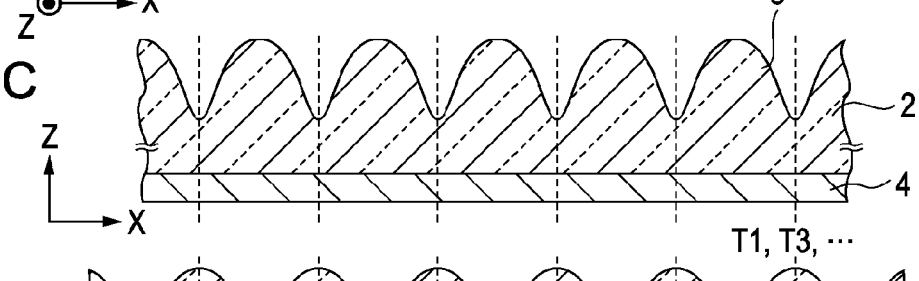
FIG. 4C is a cross-sectional view taken along tracks T1, T3, . . .
Figure 4D:
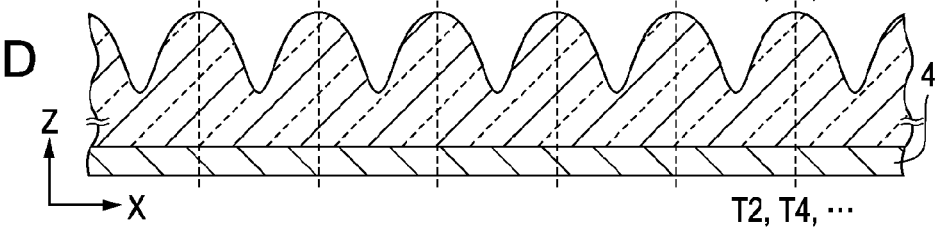
FIG. 4D is a cross-sectional view taken along tracks T2, T4, . . .
Figure 4E:
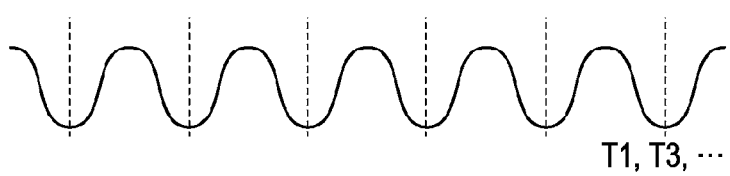
FIG. 4E is a schematic diagram showing a modulation waveform of a laser beam used in forming latent images corresponding to tracks T1, T3 . . . shown in FIG. 4B.
Figure 4F:
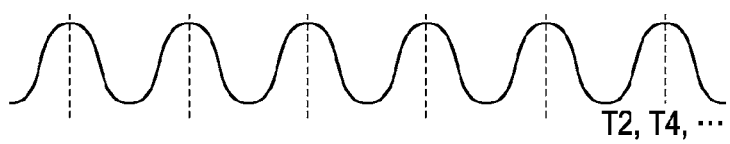
FIG. 4F is a schematic diagram showing a modulation waveform of a laser beam used in forming latent images corresponding to tracks T2, T4 . . . shown in FIG. 4B.

FIG. 4A is a schematic plan view showing an example of a configuration of an optical element 1 according to a first embodiment. FIG. 4B is an enlarged plan view showing a part of the optical element 1 shown in FIG. 4A. FIG. 4C is a cross-sectional view taken along tracks T1, T3, . . . in FIG. 4B. FIG. 4D is a cross-sectional view taken along tracks T2, T4, . . . in FIG. 4B. FIG. 4E is a schematic diagram showing a modulation waveform of a laser beam used in forming latent images corresponding to tracks T1, T3 . . . shown in FIG. 4B. FIG. 4F is a schematic diagram showing a modulation waveform of a laser beam used in forming latent images corresponding to tracks T2, T4 . . . shown in FIG. 4B. FIG. 5 and FIGS. 7 to 9 are enlarged perspective views each showing a part of the optical element 1 shown in FIG. 4A. FIG. 6A is a cross-sectional view of the optical element 1 shown in FIG. 4A in a direction in which the tracks extend (X direction (hereinafter, may also be referred to as "track direction")). FIG. 6B is a cross-sectional view of the optical element 1 shown in FIG. 4A in a θ direction.

The optical element 1 is, for example, an optical sheet sub-wavelength structure) having an anti-reflection effect in accordance with the angle of incidence of incident light. This optical element 1 is suitably applied to various optical devices such as optical instruments having various wavelength ranges (e.g., optical instruments such as a camera), displays, opto-electronics, and telescopes.

The optical element 1 includes a base 2 having a first main surface (front surface) and a second main surface (back surface) which face each other, a plurality of structures 3 which are projections, the structures 3 being arranged on the first main surface at a fine pitch equal to or less than the wavelength of visible light for which the amount of reflection is to be reduced, and a light-absorbing layer 4 provided on the second main surface. The light-absorbing layer 4 has a property of absorbing light for which the amount of reflection is to be reduced. The optical element 1 may further optionally include an adhesive layer disposed between the base 2 and the light-absorbing layer 4, and the light-absorbing layer 4 may be bonded to the base 2 with this adhesive layer. When an adhesive layer is provided in this manner, the refractive index of the base 2 is preferably the same as or substantially the same as the refractive index of the adhesive layer. This is so that reflection at the interface between the base 2 and the adhesive layer can be suppressed. The adhesive layer may also have a light-absorbing property as in the light-absorbing layer 4. Alternatively, the light-absorbing layer itself may also function as an adhesive layer. This optical element 1 has a function of preventing reflection of light that passes through the base 2 in a −Z direction of FIG. 5 at an interface between the structures 3 and the air therearound.

The base 2, the structures 3, and the light-absorbing layer 4, all of which are included in the optical element 1, will now be sequentially described.

(Base)

The base 2 is, for example, a transparent base having transparency. Examples of the base 2 include, bur are not particularly limited to, materials containing, as a main component, glass or a transparent synthetic resin such as polycarbonate (PC) or polyethylene terephthalate (PET). Examples of the shape of the base 2 include, but are not particularly limited to, a sheet shape, a plate shape, and a block shape. Herein, the definition of the term "sheet" includes a film. The shape of the base 2 is preferably appropriately selected in accordance with, for example, the shape of a portion that has a certain anti-reflection function in an optical instrument such as a camera.

(Structures)

A large number of structures 3, which are projections, are arranged on a front surface of the base 2. These structures 3 are periodically and two-dimensionally arranged at a small arrangement pitch equal to or smaller than a wavelength band of light for which the amount of reflection is to be reduced, for example, at an arrangement pitch substantially the same as the wavelength of visible light. Herein, the term "arrangement pitch" means an arrangement pitch P1 and an arrangement pitch P2. The wavelength band of light for which the amount of reflection is to be reduced is, for example, a wavelength band of ultraviolet light, a wavelength band of visible light, or a wavelength band of infrared light. Herein, the wavelength band of ultraviolet light refers to a wavelength band in the range of 10 nm to 360 nm, the wavelength band of visible light refers to a wavelength band in the range of 360 nm to 830 nm, and the wavelength band of infrared light refers to a wavelength band in the range of 830 nm to 1 mm. Specifically, the arrangement pitch is preferably 175 nm or more and 350 nm or less. When the arrangement pitch is less than 175 nm, the preparation of the structures 3 tends to become difficult. On the other hand, when the arrangement pitch exceeds 350 nm, diffraction of visible light tends to occur.

The structures 3 of the optical element 1 have an arrangement form in which a plurality of rows of tracks T1, T2, T3, . . . (hereinafter, generically referred to as "tracks T") are formed on the front surface of the base 2. In embodiments, the term "track" refers to a portion in which the structures 3 are linearly arranged in a row. Also, the term "row direction" refers to a direction orthogonal to the direction in which the tracks extend (X direction) on a formed surface of the base 2.

In two adjacent tracks T, the structures 3 are arranged at positions shifted by a half pitch. Specifically, in two adjacent tracks T, structures 3 arranged in one track (for example, T2) are arranged at half-way positions (positions shifted by a half pitch) of corresponding structures 3 arranged in another track (for example, T1). As a result, as shown in FIG. 4B, the structures 3 are arranged so as to form a hexagonal lattice pattern or a quasi-hexagonal lattice pattern in which the centers of the structures 3 are located at points a1 to a7 in three adjacent tracks (T1 to T3). In the first embodiment, the term "hexagonal lattice pattern" refers to a regular hexagonal lattice pattern. In addition, the term "quasi-hexagonal lattice pattern" refers to a hexagonal lattice pattern that is distorted by stretching in the direction in which the tracks extend (X-axis direction) unlike a regular hexagonal lattice pattern.

When the structures 3 are arranged so as to form a quasi-hexagonal lattice pattern, as shown in FIG. 4B, the arrangement pitch P1 (the distance between a1 and a2) of the structures 3 in the same track (e.g., T1) is preferably longer than the arrangement pitch of the structures 3 between two adjacent tracks (for example, T1 and T2), that is, the arrangement pitch P2 (for example, the distance between a1 and a7 or between a2 and a7) of the structures 3 in a direction of ±θ with respect to the direction in which the tracks extend. By arranging the structures 3 in this manner, a filling density of the structures 3 can be further improved.

From the stand point of the ease of forming, each of the structures 3 preferably has a cone shape or a cone shape obtained by stretching or contracting a cone shape in the track direction. Each of the structures 3 preferably has an axisymmetric cone shape of a cone shape obtained by stretching or contracting a cone shape in the track direction. When the structures 3 are joined to adjacent structures 3, each of the structures 3 preferably has an axisymmetric cone shape or a cone shape obtained by stretching or contracting a cone shape in the track direction except for a lower portion at which the structure 3 is joined to the adjacent structures 3. Examples of the cone shape include a circular cone shape, a truncated circular cone shape, an elliptical cone shape, and a truncated elliptical cone shape. Here, the term "cone shape" means a concept including not only a circular cone shape and a truncated circular cone shape but also an elliptical cone shape and a truncated elliptical cone shape, as described above. The term "truncated circular cone shape" refers to a shape obtained by truncating a top portion of a circular cone shape. The term "truncated elliptical cone shape" refers to a shape obtained by truncating a top portion of an elliptical cone shape.

Figure 5:
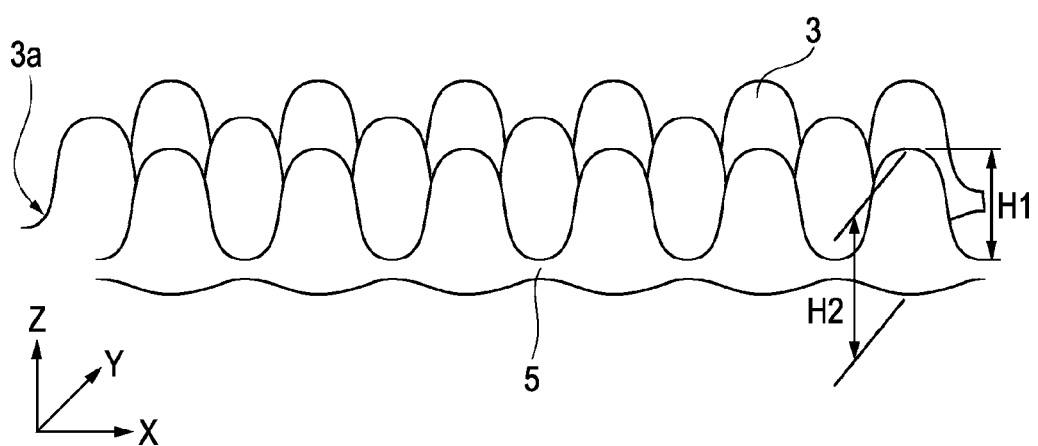
FIG. 5 is an enlarged perspective view showing a part of the optical element shown in FIG. 4A.
Figure 6A:
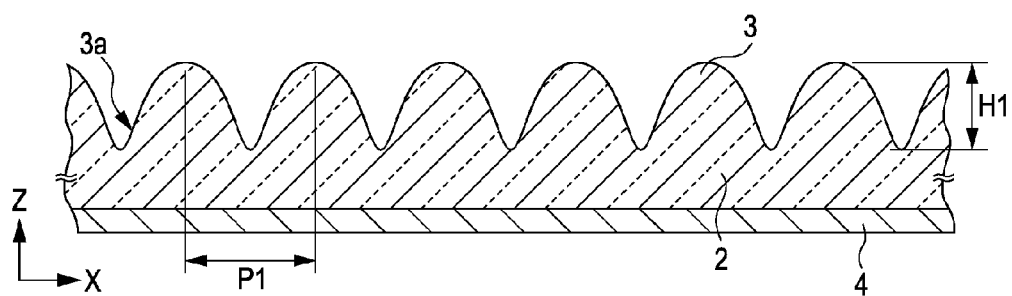
FIG. 6A is a cross-sectional view of the optical element shown in FIG. 4A in a direction in which tracks extend.
Figure 6B:
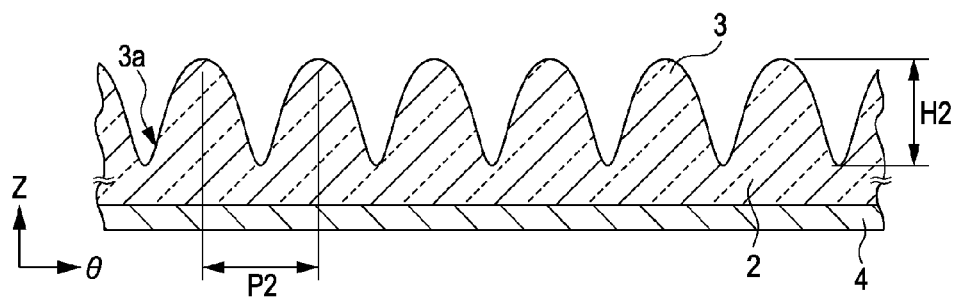
FIG. 6B is a cross-sectional view of the optical element shown in FIG. 4A in a θ direction
Figure 7:
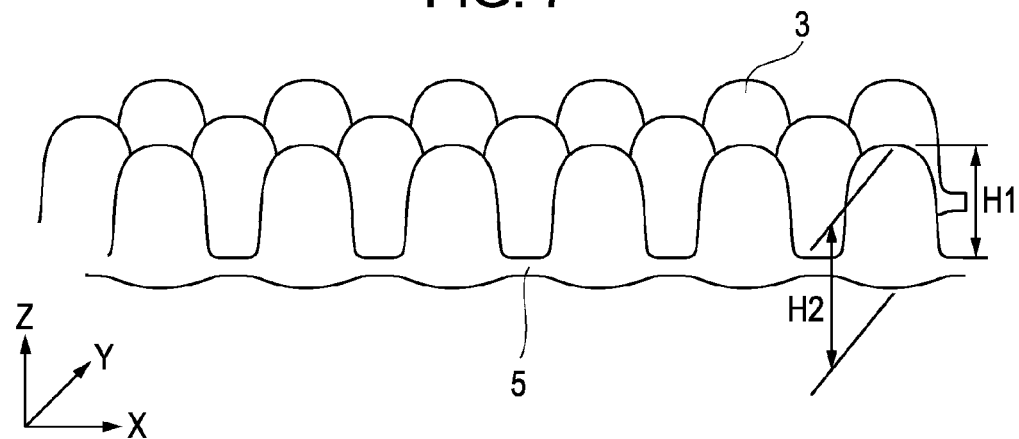
FIG. 7 is an enlarged perspective view showing a part of the optical element shown in FIG. 4A.
Figure 8:
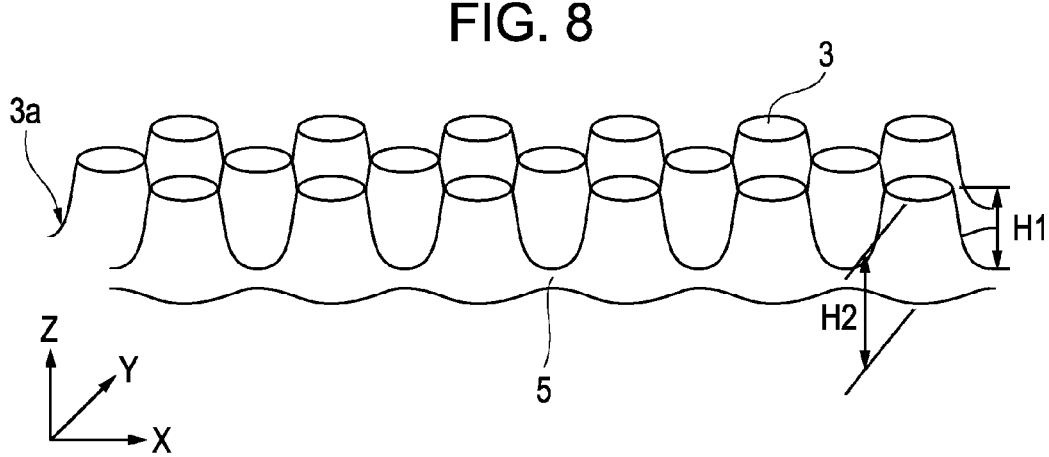
FIG. 8 is an enlarged perspective view showing a part of the optical element shown in FIG. 4A.

As shown in FIGS. 5 and 7, each of the structures 3 preferably has a conical structure, the bottom surface of which has an elliptical, oval, or egg shape having a major axis and a minor axis, and has an elliptical cone shape, the top portion of which has a curved surface. Alternatively, as shown in FIG. 8, each of the structures 3 preferably has a conical structure, the bottom surface of which has an elliptical, oval, or egg shape having a major axis and a minor axis, and has a truncated elliptical cone shape, the top portion of which is flat. This is so that the filling factor in the row direction can be improved with such a shape.

From the standpoint of improving reflection characteristics, a cone shape in which the slope of a top portion is moderate and the slope gradually becomes steeper from a central portion to a bottom portion (refer to FIG. 7) is preferable. From the standpoint of improving reflection characteristics and transmission characteristics, a cone shape in which the slope of the central portion is steeper than the slopes of the bottom portion and the top portion (refer to FIG. 5) or a cone shape in which the top portion is flat (refer to FIG. 8) is preferable. When each of the structures 3 has an elliptical cone shape or a truncated elliptical cone shape, a direction of the major axis of the bottom surface thereof is preferably parallel to the direction in which the tracks extend. In FIG. 5 and other figures, all the structures 3 have the same shape. However, the shape of the structures 3 is not limited to this. Structures 3 having two or more types of shapes may be formed on the front surface of the base. Alternatively, the structures 3 may be formed integrally with the base 2.

Figure 9:
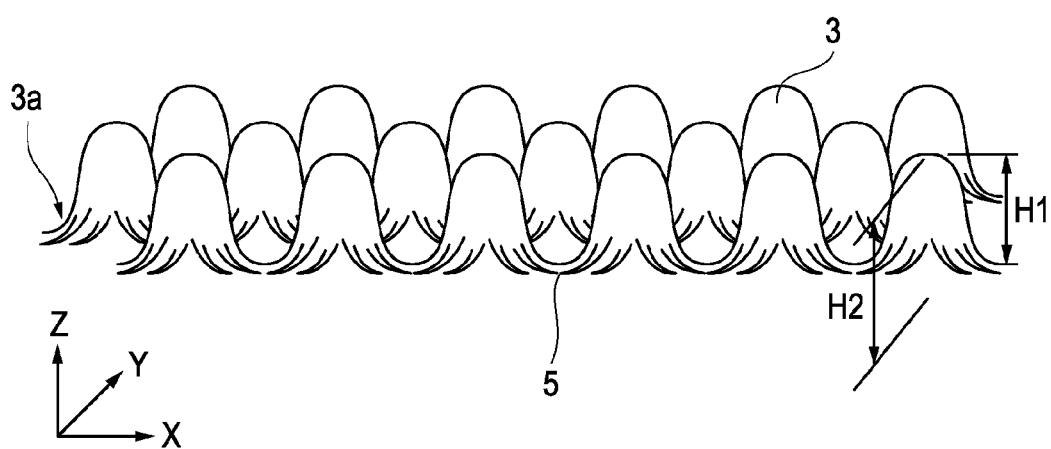
FIG. 9 is an enlarged perspective view showing a part of the optical element shown in FIG. 4A

In addition, as shown in FIG. 5 and FIGS. 7 to 9, a protruding portion 5 is preferably provided on a part of the periphery or the entire periphery of the respective structures 3. This is so that the reflectivity can be suppressed to be low even when the filling factor of the structures 3 is low. Specifically, for example, the protruding portion 5 is provided between adjacent structures 3, as shown in FIGS. 5, 7, and 8. Alternatively, as shown in FIG. 9, narrow and long protruding portions 5 may be provided on the entire periphery or a part of the periphery of the respective structures 3. These narrow and long protruding portions 5 extend, for example, in a direction from the top portion toward the lower portion of each of the structures 3. Examples of the shape of the protruding portion 5 include a triangular shape in cross section and a rectangular shape in cross section. However, the shape of the protruding portion 5 is not particularly limited thereto, and can be selected in consideration of the ease of forming and the like. Alternatively, a part of the periphery or the entire periphery of the respective structures 3 may be roughened to form fine projections and recesses. Specifically, for example, a surface between adjacent structures 3 may be roughened to form fine projections and recesses. Alternatively, fine holes may be formed on a surface, for example, the top portion of each of the structures 3.

The structures 3 are not limited to the structures each having a projecting shape shown in the figures. Alternatively, the structures 3 may be composed of recesses formed on the surface of the base 2. The height of the structures 3 is not particularly limited, and is, for example, about 420 nm, specifically in the range of 415 to 421 nm. Note that this dimension corresponds to the depth of the structures 3 when the structures 3 each have a recessed shape.

A height H1 of the structures 3 in the direction in which the tracks extend is preferably smaller than a height H2 of the structures 3 in the row direction. That is, the heights H1 and H2 of the structures 3 preferably satisfy the relationship H1<H2. The reason for this is as follows. When the structures 3 are arranged so as to satisfy the relationship H1≧H2, it is necessary that the arrangement pitch P1 in the direction in which the tracks extend be made to be long and thus the filling factor of the structures 3 in the direction in which the tracks extend decreases. Such a decrease in the filling factor results in a decrease in reflection characteristics.

Note that the aspect ratio of all the structures 3 may not be the same as each other. The structures 3 may be configured so as to have a certain height distribution (for example, an aspect ratio in the range of about 0.83 to 1.46). By providing structures 3 having a height distribution, the wavelength dependence of reflection characteristics can be reduced. Accordingly, an optical element 1 having good anti-reflection characteristics can be realized.

Here, the term "height distribution" means that structures 3 having two or more types of heights (depths) are provided on the front surface of the base 2. That is, it means that structures 3 having a standard height and other structures 3 having a height different from the standard height of the structures 3 are provided on the front surface of the base 2. The other structures 3 having the height different from the standard height are provided on the front surface of the base 2 periodically or aperiodically (randomly), for example. Examples of a direction of the periodicity include the direction in which the tracks extend and the row direction.

A skirt portion 3a is preferably provided on the peripheral portion of each of the structures 3. This is so that the optical element can be easily detached from a mold or the like in the process of producing the optical element. Herein, the skirt portion 3a means a protruding portion provided on the peripheral portion of the bottom of each structure 3. From the standpoint of the detachment property, the skirt portion 3a preferably has a curved surface in which the height gradually decreases from the top portion of the structure 3 toward the lower portion thereof. Note that the skirt portion 3a may be provided on only a part of the peripheral portion of the respective structures 3. However, from the standpoint of improving the detachment property, the skirt portion 3a is preferably provided on the entire peripheral portion of the respective structures 3. When the structures 3 are each composed of a recess, the skirt portion corresponds to a curved surface provided on the periphery of an opening of each of the recesses functioning as the structures 3.

The height (depth) of the structures 3 is not particularly limited and is appropriately determined in accordance with the wavelength range of light to be transmitted. The height (depth) of the structures 3 is determined in the range of, for example, about 236 to 450 nm. The aspect ratio (height/arrangement pitch) of the structures 3 is determined preferably in the range of 0.81 to 1.46, and more preferably in the range of 0.94 to 1.28. The reason for this is as follows. When the aspect ratio is less than 0.81, reflection characteristics and transmission characteristics tend to decrease. When the aspect ratio exceeds 1.46, the detachment property decreases in preparation of the optical element and a duplication of a replica tends to be difficult to detach properly.

Furthermore, from the standpoint of further improving reflection characteristics, the aspect ratio of the structures 3 is preferably determined in the range of 0.94 to 1.46. Similarly, from the standpoint of further improving transmission characteristics, the aspect ratio of the structures 3 is preferably determined in the range of 0.81 to 1.28.

Note that, in an embodiment, the aspect ratio is defined by formula (1) below:

$$\text{Aspect ratio} = H/P \quad (1)$$

wherein H represents a height of a structure and P represents an average arrangement pitch (average period).

Here, the average arrangement pitch P is defined by formula (2) below:

$$\text{Average arrangement pitch } P = (P1+P2+P2)/3 \quad (2)$$

wherein P1 represents an arrangement pitch in the direction in which the tracks extend (period in the direction in which the tracks extend), and P2 represents an arrangement pitch in a direction of ±θ (wherein θ=60°−δ, where δ satisfies preferably 0°<δ≦11° and more preferably 3°≦δ≦6°) with respect to the direction in which the tracks extend (period in the θ direction).

In addition, the height H of the structures 3 is assumed to be the height of the structures 3 in the row direction. The height of the structures 3 in the direction in which the tracks extend (X direction) is smaller than the height in the row direction (Y direction), and the height of portions of the structures 3 in directions other than the direction in which the tracks extend is substantially the same as the height in the row direction. Accordingly, the height of the sub-wavelength structures is represented by the height in the row direction. However, when the structures 3 are each composed of a recess, the height H of the structures in formula (1) above is assumed to be a depth H of the structures.

When the arrangement pitch of the structures 3 in the same track is represented by P1 and the arrangement pitch of the structures 3 between two adjacent tracks is represented by P2, the ratio P1/P2 preferably satisfies the relationship 1.00≦P1/P2≦1.1 or 1.00<P1/P2≦1.1. By controlling the ratio to be within these numerical ranges, the filling factor of the structures 3 each having an elliptical cone shape or a truncated elliptical cone shape can be improved. Thus, anti-reflection characteristics can be improved.

The filling factor of the structures 3 on the front surface of the base is in the range of 65% or more, preferably 73% or more, and more preferably 86% or more, and the upper limit thereof is 100%. By controlling the filling factor to be within these ranges, anti-reflection characteristics can be improved. In order to improve the filling factor, preferably, the lower portions of adjacent structures 3 are joined to each other, or distortion is provided to the structures 3 by, for example, adjusting the ellipticity of the bottom surfaces of the structures.

Here, the filling factor (average filling factor) of the structures 3 is a value determined as follows.

First, a photograph of the front surface of the optical element 1 is taken in top view with a scanning electron microscope (SEM). Next, a unit cell Uc is selected from the obtained SEM photograph at random, and the arrangement pitch P1 and a track pitch Tp of the unit cell Uc are measured (refer to FIG. 4B). In addition, the area S of the bottom surface of the structure 3 located at the center of the unit cell Uc is measured by image processing. Next, the filling factor is determined by formula (3) below using the measured arrangement pitch P1, the track pitch Tp, and the area S of the bottom surface.

$$\text{Filling factor} = (S(\text{hex.})/S(\text{unit})) \times 100 \quad (3)$$

Area of unit cell: $S(\text{unit}) = P1 \times 2Tp$

Area of bottom surfaces of structures present in unit cell: $S(\text{hex.}) = 2S$ The above-described process of calculating the filling factor is performed for ten unit cells selected from the obtained SEM photograph at random. The measured values are simply averaged (arithmetically averaged) to determine the average factor of the filling factor. This value is defined as the filling factor of the structures 3 on the front surface of the base.

When the structures 3 overlap each other or when substructures such as the protruding portions 5 are provided between the structures 3, the filling factor can be determined by a method in which a portion corresponding to a height of 5% relative to the height of the structures 3 is defined as a threshold to determine the area ratio.

Figure 10:
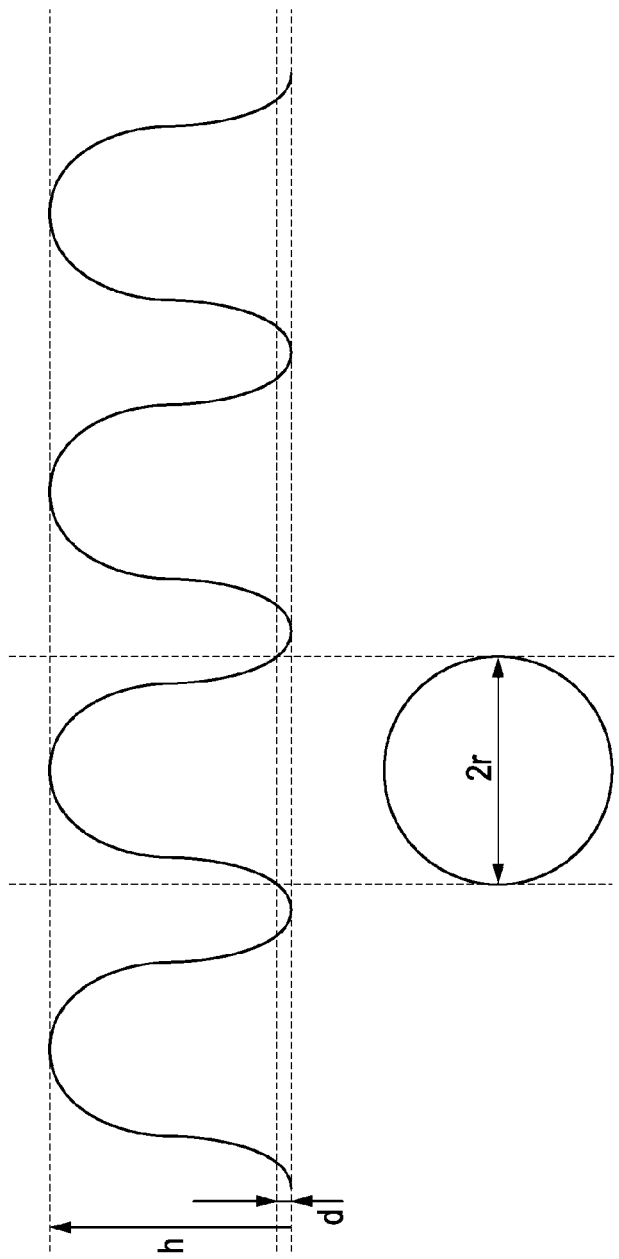
FIG. 10 is a view illustrating a method for determining the bottom surface of each structure when the boundary of structures is not clear.
Figure 11A:
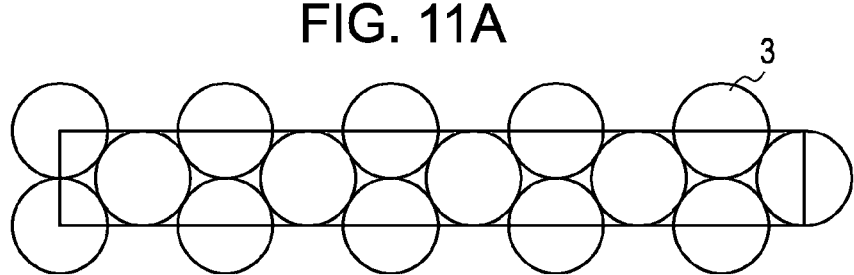
FIGS. 11A to 11D are views each showing the shape of the bottom surface when the ellipticity of the bottom surface of structures is changed.
Figure 11B:
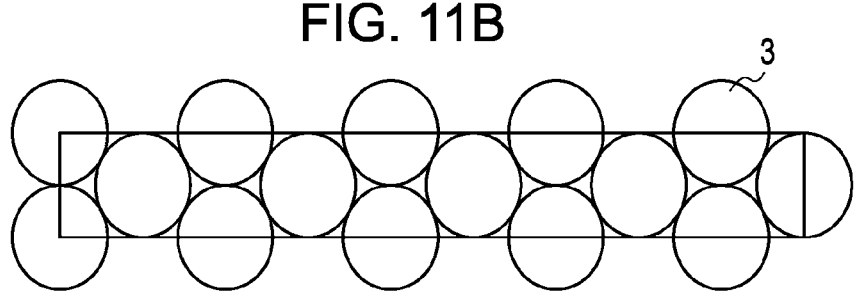
Figure 11C:
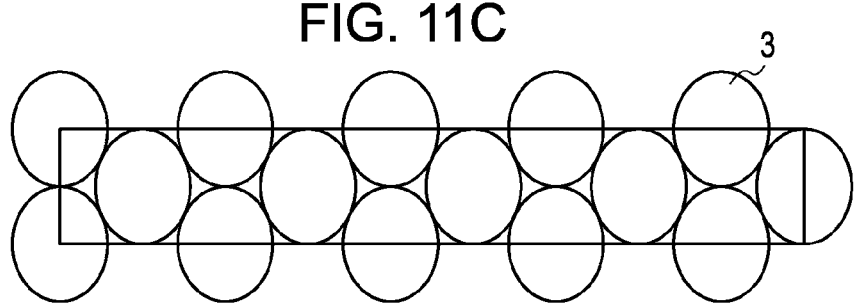
Figure 11D:
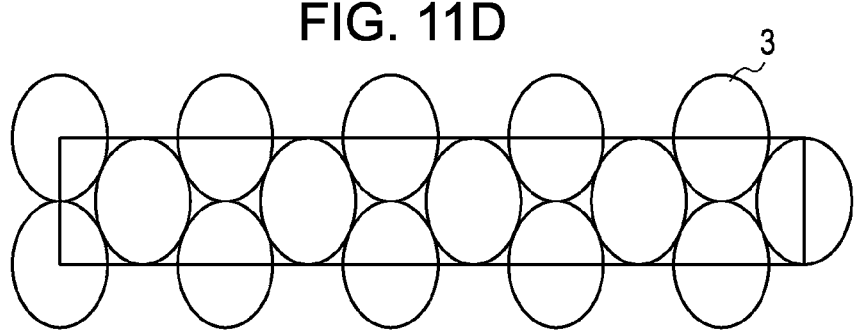

FIG. 10 is a view illustrating a method for calculating the filling factor when the boundary of structures 3 is not clear. When the boundary of the structures 3 is not clear, the filling factor is determined as follows. As shown in FIG. 10, a portion corresponding 5% (=(d/h)×100) of the height h of the structures 3 is defined as a threshold by cross-sectional SEM observation, and the diameter of the structures 3 is converted at the height d to determine the filling factor. When the bottom surface of the structures 3 is an ellipse, the same process is conducted by using the major axis and the minor axis thereof.

FIGS. 11A to 11D are views each showing the shape of the bottom surface when the ellipticity of the bottom surface of the structures 3 is changed. The ellipticities of the ellipses shown in FIGS. 11A to 11D are 100%, 110%, 120%, and 141%, respectively. By changing the ellipticity in this manner, the filling factor of the structures 3 on the front surface of the base can be changed. When the structures 3 form a quasi-hexagonal lattice pattern, the ellipticity e of the bottom surface of the structures is preferably 100%<e<150%. This is because, by controlling the ellipticity e to be within this range, the filling factor of the structures 3 can be improved to obtain good anti-reflection characteristics.

Here, when the diameter of the bottom surface of a structure in the track direction (X direction) is represented by a and the diameter of the structure in the row direction (Y direction) orthogonal to the track direction is represented by b, the ellipticity e is defined as (a/b)×100. Note that the diameters a and b of the structures 3 are values determined as follows. A photograph of the front surface of the optical element 1 is taken in top view with a scanning electron microscope (SEM), and ten structures 3 are extracted from the obtained SEM photograph at random. Next, the diameters a and b of the bottom surfaces of the respective extracted structures 3 are measured. Subsequently, the measured values a and b are respectively simply averaged (arithmetically averaged) to determine the averages of the diameters a and b. These values are defined as the diameters a and b of the structures 3.

Figure 12A:
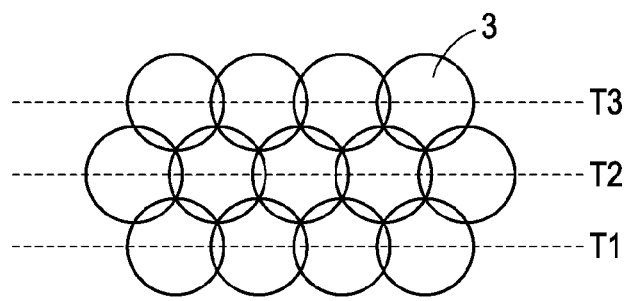
FIG. 12A is a view showing an example of the arrangement of structures each having a circular cone shape or a truncated circular cone shape.
Figure 12B:
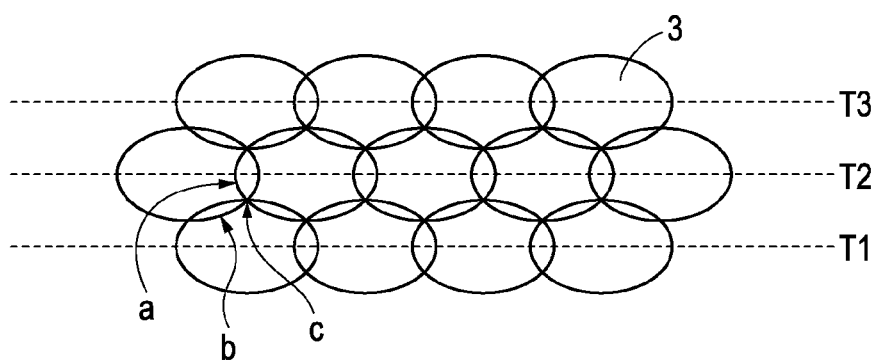
FIG. 12B is a view showing an example of the arrangement of structures each having an elliptical cone shape or a truncated elliptical cone shape.

FIG. 12A shows an example of the arrangement of structures 3 each having a circular cone shape or a truncated circular cone shape. FIG. 12B shows an example of the arrangement of structures 3 each having an elliptical cone shape or a truncated elliptical cone shape. As shown in FIGS. 12A and 12B, the structures 3 are preferably joined so that lower portions thereof overlap each other. Specifically, the lower portion of a structure 3 is preferably joined to the lower portions of some or all of adjacent structures 3. More specifically, the lower portions of the structures 3 are preferably joined in the track direction or in the θ direction, or in these two directions. FIGS. 12A and 12B each show an example in which the lower portions of all of the adjacent structures 3 are joined to the lower portion of one structure 3. The filling factor of the structures 3 can be improved by joining the structures 3 in this manner. The structures are preferably joined to each other at portions located at ¼ or less of the maximum of the wavelength band of light under the operating environment at an optical path length in which the refractive index is considered. This gives good anti-reflection characteristics.

As shown in FIG. 12B, when the lower portions of the structures 3 each having an elliptical cone shape or a truncated elliptical cone shape are joined to each other, the height of a joined portion is decreased in the order of joined portion a, joined portion b, and joined portion c, for example.

The ratio (($2r$/P1)×100) of the diameter $2r$ to the arrangement pitch P1 is 85% or more, preferably 90% or more, and more preferably 95% or more. This is because, by controlling the ratio to be within this range, the filling factor of the structures 3 can be improved to improve anti-reflection characteristics. When the ratio (($2r$/P1)×100) increases and overlapping of the structures 3 becomes too large, the anti-reflection characteristics tend to decrease. Accordingly, the upper limit of the ratio (($2r$/P1)×100) is preferably determined so that the structures are joined to each other at portions located at ¼ or less of the maximum of the wavelength band of light under the operating environment at an optical path length in which the refractive index is considered. Here, the arrangement pitch P1 is the arrangement pitch of the structures 3 in the track direction, and the diameter $2r$ is the diameter of the bottom surface of each of the structures in the track direction. When the bottom surface of each of the structures has a circular shape, the diameter $2r$ corresponds to the diameter of the circle. When the bottom surface of each of the structures has an elliptical shape, the diameter $2r$ corresponds to the major axis of the ellipse.

(Light-Absorbing Layer)

The light-absorbing layer 4 has a property of absorbing light for which the amount of reflection is to be reduced. The light-absorbing layer 4 contains, for example, a binder rein and a black colorant. The light-absorbing layer 4 may further optionally contain additives such as an organic pigment and an inorganic pigment and a dispersing agent for improving the dispersibility.

Examples of the black colorant include carbon black, titanium black, graphite, iron oxide, and titanium oxide, but are not particularly limited to these materials. Among these, carbon black, titanium black, and graphite are preferable. Carbon black is more preferable. These black colorants may be used alone or in combinations of two or more types of black colorants.

For example, commercially available carbon black can be used as the carbon black. Specific examples thereof include #980B, #850B, MCF88B, and #44B manufactured by Mitsubishi Chemical Corporation; BP-800, BP-L, REGAL-660, and REGAL-330 manufactured by Cabot Corporation; RAVEN-1255, RAVEN-1250, RAVEN-1020, RAVEN-780, and RAVEN-760 manufactured by Columbian Carbon; and Printex-55, Printex-75, Printex-25, Printex-45, and SB-550 manufactured by Degussa GmbH. These may be used alone or as a mixture.

Examples of the usable binder resin include modified or unmodified vinyl chloride resins, polyurethane resins, phenoxy resins, and polyester resins. Examples thereof further include cellulose esters such as cellulose acetate butyrate. Alternatively, a thermoplastic resin, a thermosetting resin, an ionizing radiation-curable resin, or the like is used by a specific method may also be used. As the ionizing radiation-curable resin, an electron beam-curable resin or an ultraviolet-curable resin is preferable.

[Configuration of Roll Master]

Figure 13A:
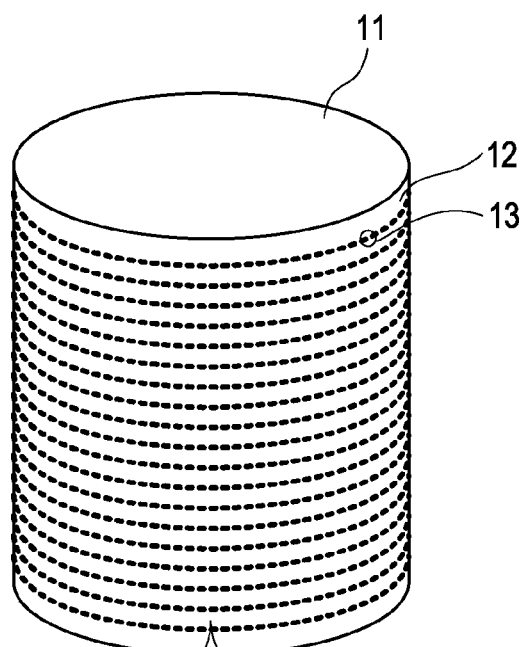
FIG. 13A is a perspective view showing an example of a configuration of a roll master for preparing an optical element.
Figure 13B:
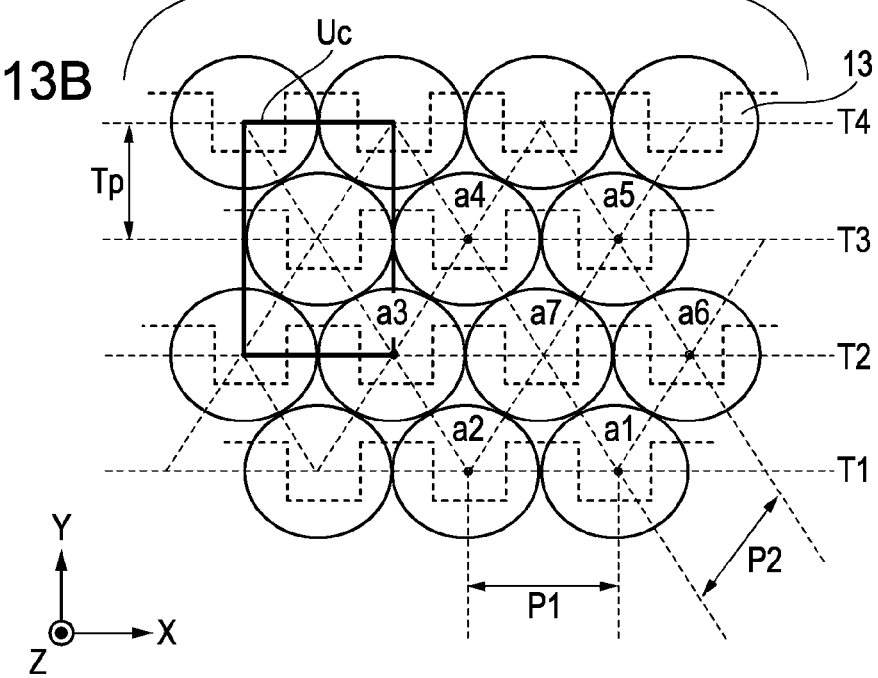
FIG. 13B is a plan view showing an example of a configuration of the roll master for preparing an optical element.

FIGS. 13A and 13B show an example of a configuration of a roll master for preparing the optical element having the configuration described above. As shown in FIGS. 13A and 13B, a roll master 11 has, for example, a configuration in which a large number of structures 13 which are recesses are arranged on a surface of a master 12 at a pitch substantially the same as the wavelength of light such as visible light. The master 12 has a columnar shape or a cylindrical shape. For example, glass can be used as the material of the master 12, but the material is not particularly limited to this. Patterning is performed using a roll master exposure apparatus described below at an appropriate feed pitch at a constant angular velocity (CAV) while a polarity inversion formatter signal is synchronized with a rotation controller of a recording unit in each track to generate signals in such a manner that a two-dimensional pattern is spatially linked. Thus, a hexagonal lattice pattern or a quasi-hexagonal lattice pattern can be recorded. A lattice pattern having a uniform spatial frequency is formed in a desired recording area by appropriately setting the frequency of the polarity inversion formatter signal and the number of rotations of the roll.

[Method for Producing Optical Element]

A method for producing the optical element 1 constituted as described above will now be described with reference to FIG. 14 and FIGS. 15A to 16D.

The method for producing an optical element according to the first embodiment includes a resist film formation step of forming a resist layer on a master, an exposure step of forming latent images of a moth-eye pattern in the resist layer using a roll master exposure apparatus, and a development step of developing the resist layer on which the latent images are formed. The method further includes an etching step of preparing a roll master using plasma etching, a duplication step of preparing a duplicate substrate using an ultraviolet-curable resin, and a light-absorbing layer formation step of forming a light-absorbing layer on the back surface of the prepared duplicate substrate.

(Configuration of Exposure Apparatus)

First, the configuration of a roll master exposure apparatus used in the exposure step of a moth-eye pattern will be described with reference to FIG. 14. This roll master exposure apparatus is constituted on the basis of an optical-disk recording apparatus.

A laser light source 21 is a light source for exposing a resist film formed on a surface of a master 12 serving as a recording medium and oscillates a laser beam 15 for recording with a wavelength $\lambda$=266 nm, for example. The laser beam 15 emitted from the laser light source 21 goes straight in the form of a collimated beam and enters an electro-optical modulator (EOM) 22. The laser beam 15 transmitted through the electro-optical modulator 22 is reflected at a mirror 23, and is led to a modulation optical system 25.

The mirror 23 is formed of a polarization beam splitter and has a function of reflecting one polarized component and transmitting the other polarized component. The polarized component transmitted through the mirror 23 is sensed by a photodiode 24. The electro-optical modulator 22 is controlled on the basis of the sensed light signal to conduct phase modulation of the laser beam 15.

In the modulation optical system 25, the laser beam 15 is focused by a condenser lens 26 to an acousto-optic modulator (AOM) 27 composed of glass ($SiO_2$) or the like. The laser beam 15 is diverged through intensity modulation with the acousto-optic modulator 27, and is then formed into a collimated beam by a lens 28. The laser beam 15 emitted from the modulation optical system 25 is reflected from a mirror 31 and horizontally guided to a moving optical table 32 in parallel.

The moving optical table 32 is provided with a beam expander (BEX) 33 and an objective lens 34. The laser beam 15 led to the moving optical table 32 is shaped into a desired beam shape with the beam expander 33 and is then applied to the resist layer on the master 12 through the objective lens 34. The master 12 is placed on a turntable 36 connected to a spindle motor 35. Subsequently, the exposure step of the resist layer is conducted by intermittently irradiating the resist layer with the laser beam 15 while the master 12 is rotated and, in addition, the laser beam 15 is moved in a height direction of the master 12. The formed latent images each have a substantially elliptical shape having a major axis extending in the circumferential direction. The movement of the laser beam 15 is conducted by a movement of the moving optical table 32 in the direction indicated by an arrow R.

The exposure apparatus includes a control mechanism 37 for forming latent images in the resist layer, the latent images corresponding to the two-dimensional pattern of the hexagonal lattice pattern or quasi-hexagonal lattice pattern shown in FIG. 4B. The control mechanism 37 includes a formatter 29 and a driver 30. The formatter 29 is provided with a polarity inversion unit. This polarity inversion unit controls the irradiation timing of the laser beam 15 applied to the resist layer. The driver 30 controls the acousto-optic modulator 27 in response to an output from the polarity inversion unit.

In this roll master exposure apparatus, a polarity inversion formatter signal and a rotation controller of the recording unit are synchronized in each track in such a manner that a two-dimensional pattern is spatially linked to generate signals, and intensity modulation is conducted by the acousto-optic modulator 27. A hexagonal lattice pattern or a quasi-hexagonal lattice pattern can be recorded by patterning at a constant angular velocity (CAV) and an appropriate number of rotations, an appropriate modulation frequency, and an appropriate feed pitch. For example, as shown in FIG. 13B, in order to control the period in the circumferential direction to be 270 nm and to control the period in a direction of about 60 degrees (direction about −60 degrees) with respect to the circumferential direction to be 260 nm, the feed pitch may be controlled to be 222 nm (Pythagorean theorem). The frequency of the polarity inversion formatter signal is changed by changing the number of rotations (1,800 rpm) of the roll. In a desired recording area, a quasi-hexagonal lattice pattern having a uniform spatial frequency (period in the circumferential direction: 290 nm, period in the direction of about 60 degrees (direction about −60 degrees) with respect to the circumferential direction: 260 nm, feed pitch: 216 nm) is obtained by diverging a far-ultraviolet laser beam so that the beam diameter thereof increases fivefold with the beam expander 33 on the moving optical table 32, and irradiating the resist layer on the master 12 with the laser beam through the objective lens 34 with a numerical aperture (NA) of 0.9 to form fine latent images.

The steps of the method for producing an optical element according to the first embodiment will now be sequentially described.

(Resist Film Formation Step)

Figure 15A:
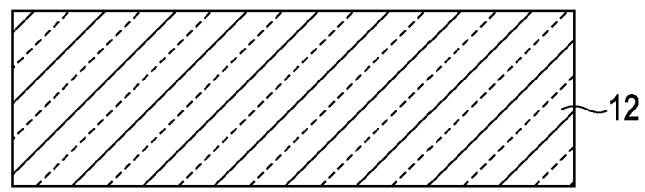
FIGS. 15A to 15C are process views illustrating a method for producing an optical element according to the first embodiment.
Figure 15B:
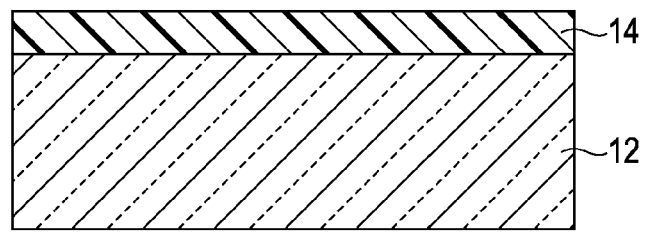

First, as shown in FIG. 15A, a columnar master 12 is prepared. This master 12 is, for example, a glass master. Next, as shown in FIG. 15B, a resist layer 14 is formed on a surface of the master 12. For example, either an organic resist or an inorganic resist may be used as the material of the resist layer 14. Examples of the organic resist that can be used include novolak resists and chemically amplified resists. Examples of the inorganic resist that can be used include metal oxides containing one type or two or more types of transition metals such as tungsten and molybdenum.

(Exposure Step)

Figure 15C:
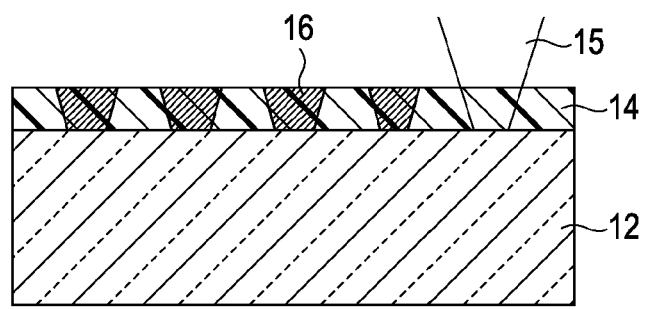

Next, as shown in FIG. 15C, the resist layer 14 is irradiated with a laser beam (exposure beam) 15 using the roll master exposure apparatus described above while the master 12 is rotated. In this step, the entire surface of the resist layer 14 is exposed by intermittently irradiating the resist layer 14 with the laser beam 15 while the laser beam 15 is moved in the height direction of the master 12 (direction parallel to the central axis of the columnar or cylindrical master 12). Thus, latent images 16 corresponding to the trajectory of the laser beam 15 are formed on the entire surface of the resist layer 14 at a pitch substantially the same as the wavelengths of visible light.

For example, the latent images 16 are arranged so as to form a plurality of rows of tracks on the surface of the master and form a hexagonal lattice pattern or a quasi-hexagonal lattice pattern. Each of the latent images 16 has, for example, an elliptical shape, the major axis direction of which is a direction in which the tracks extend.

(Development Step)

Next, as shown in FIG. 16A, the resist layer 14 is developed by dropping a developer on the resist layer 14 while the master 12 is rotated. As shown in the figure, when the resist layer 14 is formed of a positive resist, exposed portions exposed with the laser beam 15 have a high dissolution rate to the developer as compared with unexposed portions. Accordingly, a pattern corresponding to the latent images (exposed portions) 16 is formed on the resist layer 14.

(Etching Step)

Next, the surface of the master 12 is etched using, as a mask, the pattern (resist pattern) of the resist layer 14 formed on the master 12. Accordingly, as shown in FIG. 16B, recesses, i.e., structures 13, each having an elliptical cone shape or truncated elliptical cone shape, the major axis direction of which is a direction in which the tracks extend, can be obtained. For example, dry etching is employed as the etching method. In this step, for example, a pattern of cone-shaped structures 13 can be formed by alternately performing an etching process and an ashing process. In addition, a glass master having a depth three times or more the thickness of the resist layer 14 (selection ratio: 3 or more) can be prepared, and thus a high aspect ratio of structures 3 can be realized. As the dry etching, plasma etching using a roll etching apparatus is preferable. The roll etching apparatus is a plasma etching apparatus including a columnar electrode and is configured so that the columnar electrode is inserted into a cavity of a cylindrical master 12 to perform plasma etching of a cylindrical surface of the master 12.

Thus, a roll master 11 having a hexagonal lattice pattern or quasi-hexagonal lattice pattern including recesses each having a depth in the range of, for example, about 120 to 350 nm is obtained.

(Duplication Step)

Next, a base 2 such as a sheet to which a transfer material is applied is brought into close contact with the roll master 11, and the base 2 is detached from the roll master 11 while the transfer material is cured by irradiation of ultraviolet light. Accordingly, as shown in FIG. 16C, a plurality of structures, which are projections, are formed on a first main surface of the base 2 to prepare an optical element 1 such as a moth-eye ultraviolet-cured duplicate sheet.

The transfer material contains, for example, an ultraviolet-curable material and an initiator, and optionally contains fillers, functional additives, and the like.

Examples of the ultraviolet-curable material include monofunctional monomers, bifunctional monomers, and polyfunctional monomers. Specifically, the following materials may be used alone or as a mixture of two or more materials.

Examples of the monofunctional monomers include carboxylic acids (acrylic acid), hydroxy compounds (2-hydroxyethyl acrylate, 2-hydroxypropyl acrylate, and 4-hydroxybutyl acrylate), alkyls, alicyclic compounds (isobutyl acrylate, t-butyl acrylate, isooctyl acrylate, lauryl acrylate, stearyl acrylate, isobornyl acrylate, and cyclohexyl acrylate), and other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropyl acrylamide, N,N-dimethylacrylamide, acryloylmorpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of the bifunctional monomers include tri(propylene glycol)diacrylate, trimethylolpropane diallyl ether, and urethane acrylate.

Examples of the polyfunctional monomers include trimethylolpropane triacrylate, dipentaerythritol penta/hexa acrylate, and ditrimethylolpropane tetraacrylate.

Examples of the initiator include 2,2-dimethoxy-1,2-diphenylethan-1-one, 1-hydroxy-cyclohexyl phenyl ketone, and 2-hydroxy-2-methyl-1-phenylpropan-1-one.

As the fillers, for example, inorganic fine particles or organic fine particles can be used. Examples of the inorganic fine particles include fine particles of a metal oxide such as $SiO_2$, $TiO_2$, $ZrO_2$, $SnO_2$, or $Al_2O_3$.

Examples of the functional additives include a leveling agent, a surface control agent, and an anti-foaming agent. Examples of the material of the base 2 include methyl methacrylate (co)polymers, polycarbonate, styrene (co)polymers, methyl methacrylate-styrene copolymers, cellulose diacetate, cellulose triacetate, cellulose acetate butyrate, polyesters, polyamides, polyimides, polyethersulfone, polysulfone, polypropylene, polymethylpentene, polyvinyl chloride, polyvinyl acetal, polyetherketones, polyurethanes, and glass.

The method of forming the base 2 is not particularly limited. The base 2 may be an injection-molded body, an extruded body, or a cast body. A surface treatment such as a corona treatment may be optionally conducted on the surface of the base.

(Light-Absorbing Layer Formation Step)

Next, as shown in FIG. 16D, a light-absorbing layer 4 is formed on a second main surface, which is on the opposite side of the first main surface. As a method for forming the light-absorbing layer 4, for example, a method in which an ionizing radiation-curable resin composition containing a black colorant is applied onto the second main surface of the optical element 1, and is then cured by applying ultraviolet light, an electron beam, or the like can be employed. Alternatively, a method in which a sheet or the like containing a black colorant is bonded to the second main surface of the optical element 1 with an adhesive layer therebetween may also be employed.

Thus, the target optical element 1 including the light-absorbing layer 4 is obtained.

In this first embodiment, a plurality of structures 3 are arranged on the front surface of a base at a fine pitch equal to or less than the wavelength of light for which the amount of reflection is to be reduced (for example, equal to or less than the wavelength of visible light) so that a hexagonal lattice pattern or a quasi-hexagonal lattice pattern is formed in three adjacent tracks. Accordingly, the efficiency of preventing reflection of light, such as visible light, for which the amount of reflection is to be reduced can be increased to achieve good anti-reflection characteristics. Furthermore, the back-surface reflection can be substantially eliminated by forming the light-absorbing layer 4, which contains a material having a property of highly absorbing light such as visible light, on the back surface of the base. Consequently, reflection of light at the surface of a component provided in a lens barrel of an optical instrument such as a camera or a telescope, the inner circumferential surface of the lens barrel, and the like can be suppressed. Accordingly, ghosts and flare can be prevented, and optical characteristics such as the contrast can be improved.

When the optical element 1 is prepared by a method in which a process for preparing a master of an optical disk is combined with an etching process, the time necessary for the process of preparing a master (exposure time) can be significantly reduced, as compared with the case where the optical element 1 is prepared by using an electron beam exposure technique. Accordingly, productivity of the optical element 1 can be markedly improved.

Second Embodiment (An example in which structures are two-dimensionally arranged in a straight line and in a tetragonal lattice pattern: refer to FIGS. 17A to 17F)

[Configuration of Optical Element]

Figure 17A:
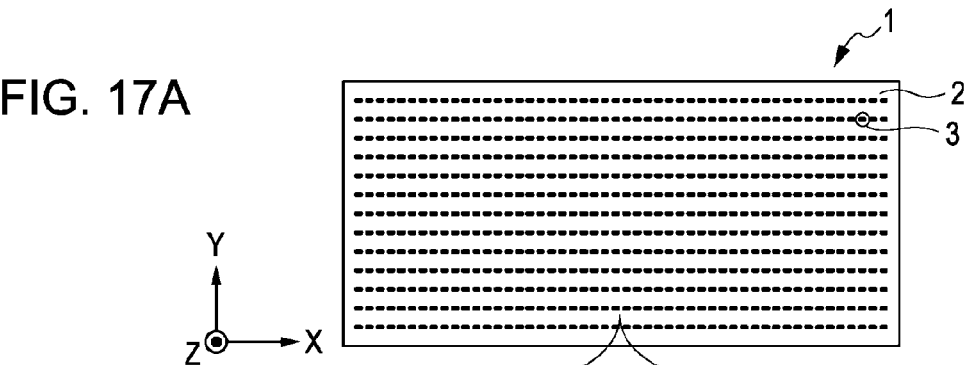
FIG. 17A is a schematic plan view showing an example of a configuration of an optical element according to a second embodiment.
Figure 17B:
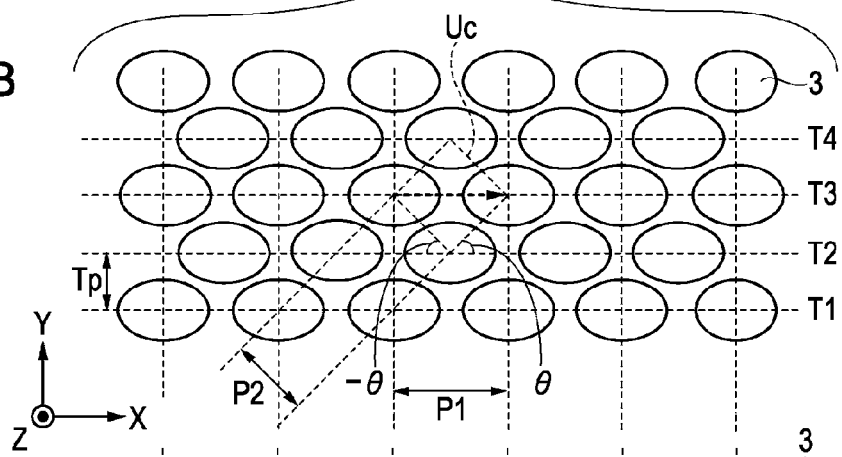
FIG. 17B is an enlarged plan view showing a part of the optical element shown in FIG. 17A.
Figure 17C:
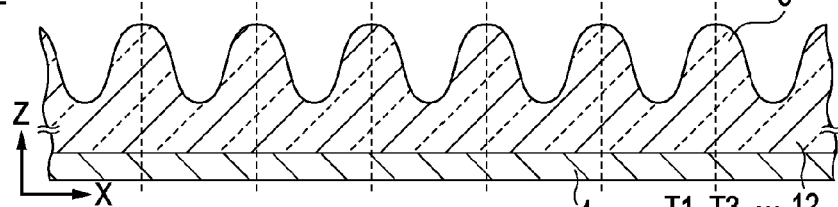
FIG. 17C is a cross-sectional view taken along tracks T1, T3, . . .
Figure 17D:
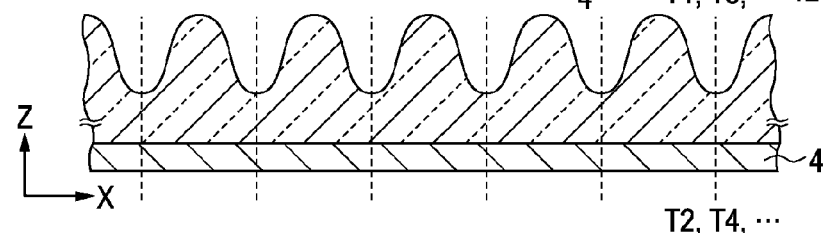
FIG. 17D is a cross-sectional view taken along tracks T2, T4, . . .
Figure 17E:
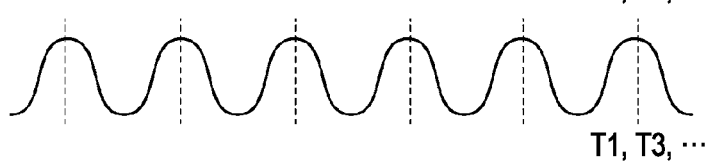
FIG. 17E is a schematic diagram showing a modulation waveform of a laser beam used in forming latent images corresponding to tracks T1, T3 . . . shown in FIG. 17B.
Figure 17F:
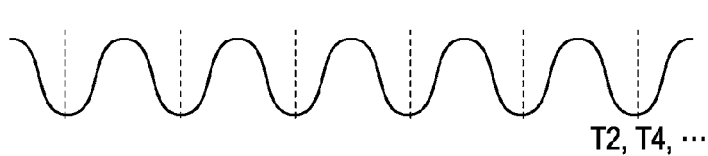
FIG. 17F is a schematic diagram showing a modulation waveform of a laser beam used in forming latent images corresponding to tracks T2, T4 . . . shown in FIG. 17B.

FIG. 17A is a schematic plan view showing an example of a configuration of an optical element according to a second embodiment. FIG. 17B is an enlarged plan view showing a part of the optical element shown in FIG. 17A. FIG. 17C is a cross-sectional view taken along tracks T1, T3, . . . in FIG. 17B. FIG. 17D is a cross-sectional view taken along tracks T2, T4, . . . in FIG. 17B. FIG. 17E is a schematic diagram showing a modulation waveform of a laser beam used in forming latent images corresponding to tracks T1, T3 . . . shown in FIG. 17B. FIG. 17F is a schematic diagram showing a modulation waveform of a laser beam used in forming latent images corresponding to tracks T2, T4 . . . shown in FIG. 17B.

An optical element 1 of the second embodiment differs from that of the first embodiment in that structures 3 form a tetragonal lattice pattern or a quasi-tetragonal lattice pattern in three adjacent tracks. In embodiments, the term "quasi-tetragonal lattice pattern" means a tetragonal lattice pattern that is distorted by stretching in the direction in which the tracks extend (X direction) unlike a regular tetragonal lattice pattern.

The height or the depth of the structures 3 is not particularly limited, and is, for example, about 159 to 312 nm. A pitch P2 in a direction of (about) 45 degrees with respect to the tracks is, for example, about 275 to 297 nm. The aspect ratio (height/arrangement pitch) of the structures 3 is, for example, in the range of about 0.54 to 1.13. Furthermore, the aspect ratio of all the structures 3 may not be the same as each other. Alternatively, the structures 3 may be configured so as to have a certain height distribution.

An arrangement pitch P1 of the structures 3 in the same track is preferably longer than the arrangement pitch P2 of the structures 3 between two adjacent tracks. When the arrangement pitch of the structures 3 in the same track is represented by P1, and the arrangement pitch of the structures 3 between two adjacent tracks is represented by P2, the ratio P1/P2 preferably satisfies the relationship 1.4<P1/P2≦1.5. By controlling the ratio to be within this numerical range, the filling factor of the structures 3 each having an elliptical cone shape or a truncated elliptical cone shape can be improved. Thus, anti-reflection characteristics can be improved. In addition, the height or the depth of the structures 3 in the direction of 45 degrees or about 45 degrees with respect to the tracks is preferably smaller than the height or the depth of the structures 3 in the direction in which the tracks extend.

A height H2 of the structures 3 in the arrangement direction (θ direction) that is slanted with respect to the direction in which the tracks extend is preferably smaller than a height H1 of the structures 3 in the direction in which the tracks extend. That is, the heights H1 and H2 of the structures 3 preferably satisfy the relationship H1>H2.

Figure 18:
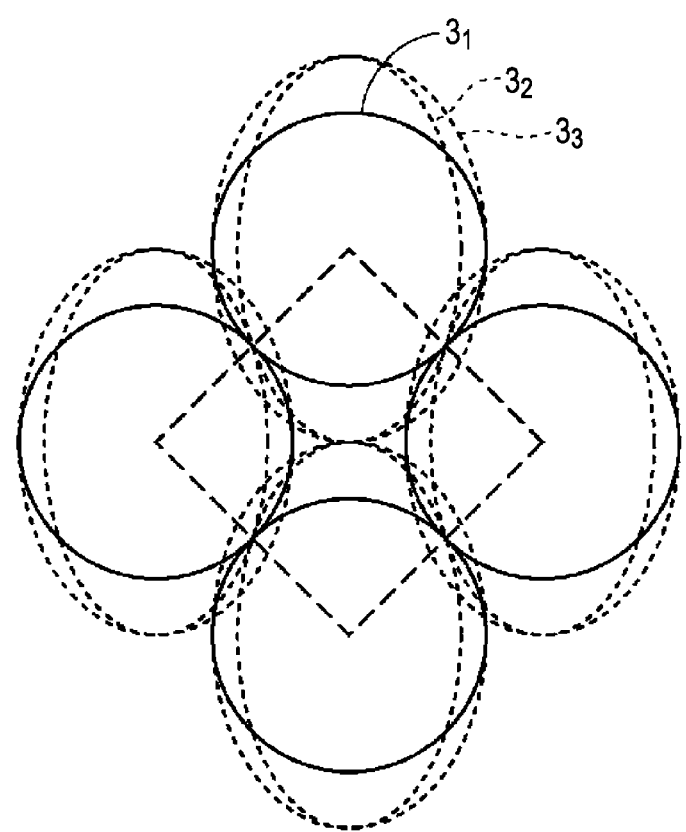
FIG. 18 is a view showing the shapes of the bottom surfaces when the ellipticity of the bottom surfaces of structures is changed.

FIG. 18 is a view showing the shapes of the bottom surfaces when the ellipticity of the bottom surfaces of the structures 3 is changed. The ellipticities of the ellipses $3_1$, $3_2$, and $3_3$ are 100%, 163.3%, and 141%, respectively. By changing the ellipticity in this manner, the filling factor to the structures 3 on the front surface of the base can be changed. When the structures 3 form a tetragonal lattice pattern or a quasi-tetragonal lattice pattern, the ellipticity e of the bottom surfaces of the structures is preferably 150%≦e≦180%. This is because, by controlling the ellipticity e to be within this range, the filling factor of the structures 3 is improved to obtain good anti-reflection characteristics.

The filling factor of the structures 3 on the front surface of the base is in the range of 65% or more, preferably 73% or more, and more preferably 86% or more, and the upper limit thereof is 100%. By controlling the filling factor to be within these ranges, anti-reflection characteristics can be improved.

Here, the filling factor (average filling factor) of the structures 3 is a value determined as follows.

First, a photograph of the front surface of the optical element 1 is taken in top view with a scanning electron microscope (SEM). Next, a unit cell Uc is selected from the obtained SEM photograph at random, and the arrangement pitch P1 and a track pitch Tp of the unit cell Uc are measured (refer to FIG. 17B). In addition, the area S of the bottom surface of any of four structures 3 included in the unit cell Uc is measured by image processing. Next, the filling factor is determined by formula (4) below using the measured arrangement pitch P1, the track pitch Tp, and the area S of the bottom surface.

Filling factor=(S(tetra)/S(unit))×100 (4)

Area of unit cell: S(unit)=2×((P1×Tp)×(½))=P1×Tp

Area of bottom surfaces of structures present in unit cell: S(tetra)=S

The above-described process of calculating the filling factor is performed for ten unit cells selected from the obtained SEM photograph at random. The measured values are simply averaged (arithmetically averaged) to determine the average factor of the filling factor. This value is defined as the filling factor of the structures 3 on the front surface of the base.

The ratio ((2r/P1)×100) of the diameter 2r to the arrangement pitch P1 is 64% or more, preferably 69% or more, and more preferably 73% or more. This is because, by controlling the ratio to be within this range, the filling factor of the structures 3 can be improved to improve anti-reflection characteristics. Here, the arrangement pitch P1 is the arrangement pitch of the structures 3 in the track direction, and the diameter 2r is the diameter of the bottom surface of each of the structures in the track direction. When the bottom surface of each of the structures has a circular shape, the diameter 2r corresponds to the diameter of the circle. When the bottom surface of each of the structures has an elliptical shape, the diameter 2r corresponds to the major axis of the ellipse.

[Configuration of Roll Master]

Figure 19A:
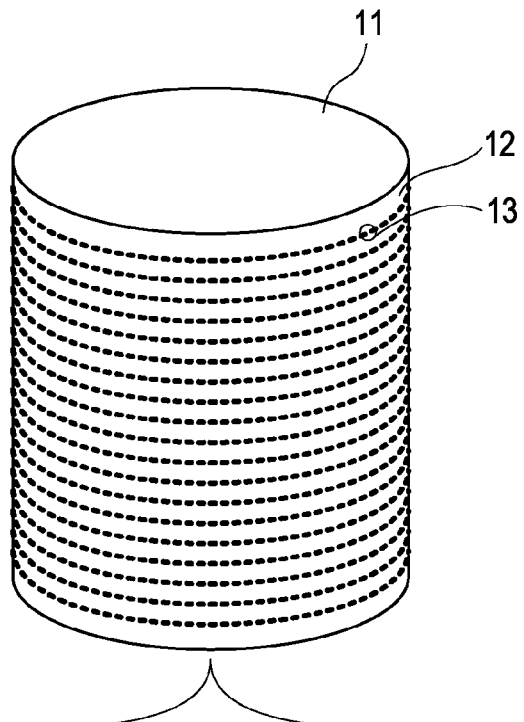
FIG. 19A is a perspective view showing an example of a configuration of a roll master for preparing an optical element.
Figure 19B:
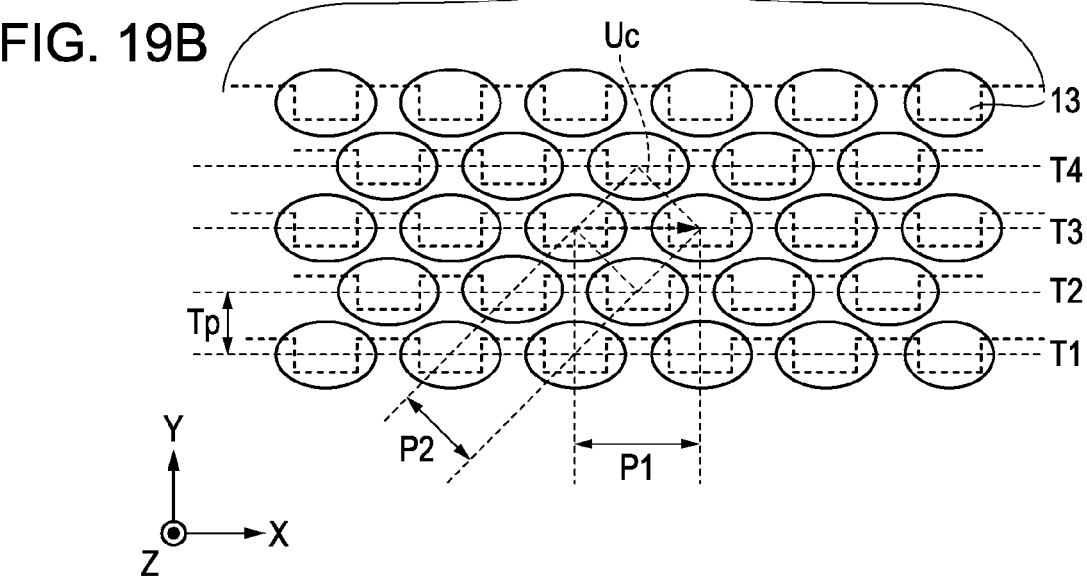
FIG. 19B is a plan view showing an example of a configuration of the roll master for preparing an optical element.

FIGS. 19A and 19B show an example of a configuration of a roll master for preparing the optical element having the above configuration. This roll master differs from that of the first embodiment in that recessed structures 13 form a tetragonal lattice pattern or a quasi-tetragonal lattice pattern on the surface thereof.

Patterning is performed using a roll master exposure apparatus at an appropriate feed pitch at a CAV while a polarity inversion formatter signal is synchronized with a rotation controller of a recording unit in each track to generate signals in such a manner that a two-dimensional pattern is spatially linked. Thus, a tetragonal lattice pattern or a quasi-tetragonal lattice pattern can be recorded. Preferably, a lattice pattern having a uniform spatial frequency is formed in a desired recording area of a resist formed on a master 12 by irradiation of a laser beam by appropriately setting the frequency of the polarity inversion formatter signal and the number of rotations of the roll.

In this second embodiment, a plurality of structures 3 are arranged on the front surface of a base at a fine pitch equal to or less than the wavelength of light for which the amount of reflection is to be reduced (for example, equal to or less than the wavelength of visible light) so that a tetragonal lattice pattern or a quasi-tetragonal lattice pattern is formed in three adjacent tracks. Accordingly, the efficiency of preventing reflection of light, such as visible light, for which the amount of reflection is to be reduced can be increased to achieve good anti-reflection characteristics. Furthermore, the back-surface reflection can be substantially eliminated by forming the light-absorbing layer 4, which contains a material having a property of highly absorbing light such as visible light, on the back surface of the base. Consequently, reflection of light at the surface of a component provided in a lens barrel of an optical instrument such as a camera or a telescope, the inner circumferential surface of the lens barrel, and the like can be suppressed. Accordingly, ghosts and flare can be prevented, and optical characteristics such as the contrast can be improved.

Third Embodiment (An example in which structures are two-dimensionally arranged in a circular arc and in a hexagonal lattice pattern: refer to FIGS. 20A to 20D)

[Configuration of Optical Element]

Figure 20A:
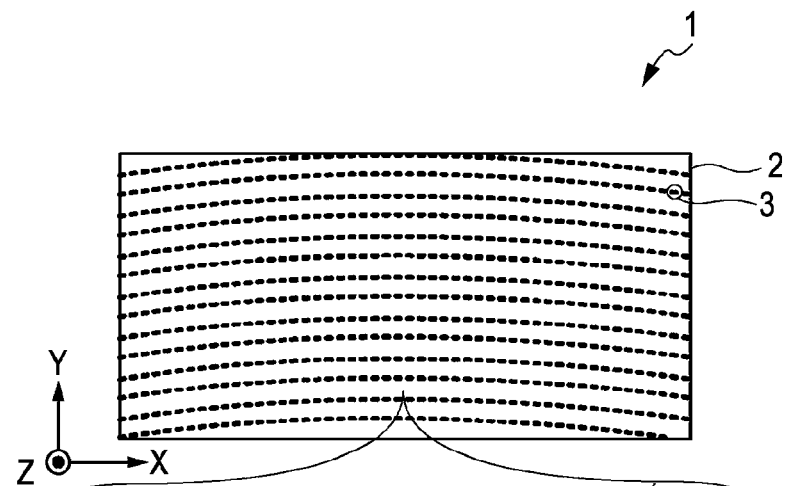
FIG. 20A is a schematic plan view showing an example of a configuration of an optical element according to a third embodiment.
Figure 20B:
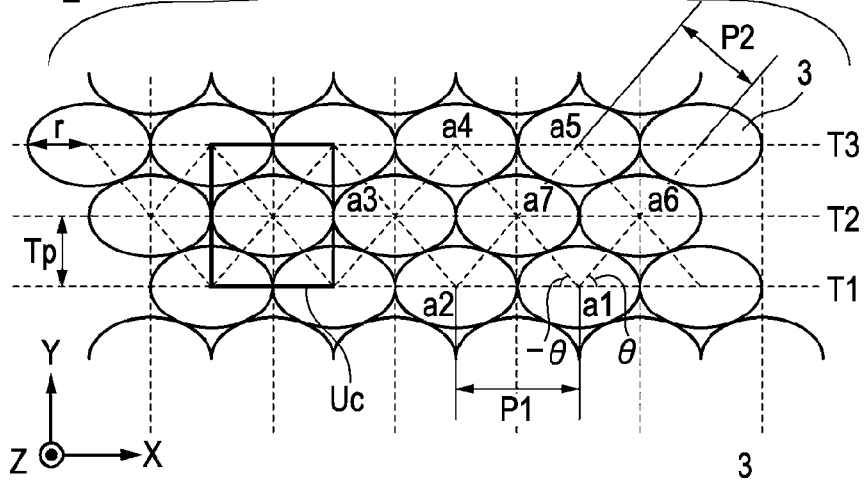
FIG. 20B is an enlarged plan view showing a part of the optical element shown in FIG. 20A.
Figure 20C:
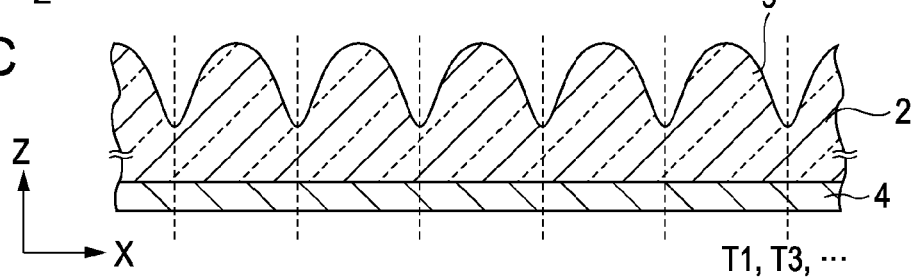
FIG. 20C is a cross-sectional view taken along tracks T1, T3, . . .
Figure 20D:
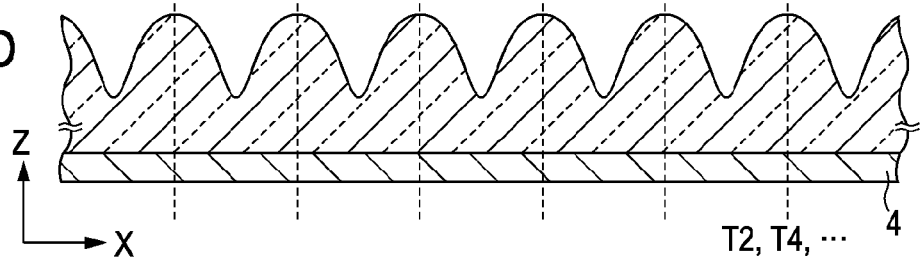
FIG. 20D is a cross-sectional view taken along tracks T2, T4, . . .

FIG. 20A is a schematic plan view showing an example of a configuration of an optical element according to a third embodiment. FIG. 20B is an enlarged plan view showing a part of the optical element shown in FIG. 20A. FIG. 20C is a cross-sectional view taken along tracks T1, T3, . . . in FIG. 20B. FIG. 20D is a cross-sectional view taken along tracks T2, T4, . . . in FIG. 20B.

An optical element 1 of the third embodiment differs from that of the first embodiment in that tracks T each have a circular arc shape and the structures 3 are arranged in a circular arc. As shown in FIG. 20B, the structures 3 are arranged so as to form a quasi-hexagonal lattice pattern in which the centers of the structures 3 are located at points a1 to a7 in three adjacent tracks (T1 to T3). Here, the term "quasi-hexagonal lattice pattern" means a hexagonal lattice pattern that is distorted along the circular arcs of the tracks T unlike a regular hexagonal lattice pattern. Alternatively, the quasi-hexagonal lattice pattern refers to a hexagonal lattice pattern that is distorted along the circular arcs of the tracks T, and in addition, that is distorted by stretching in a direction in which the tracks extend (X-axis direction) unlike a regular hexagonal lattice pattern.

The configuration other than the above-described configuration of the optical element 1 is the same as that of the first embodiment. Therefore, a description thereof is omitted.

[Configuration of Disk Master]

Figure 21A:
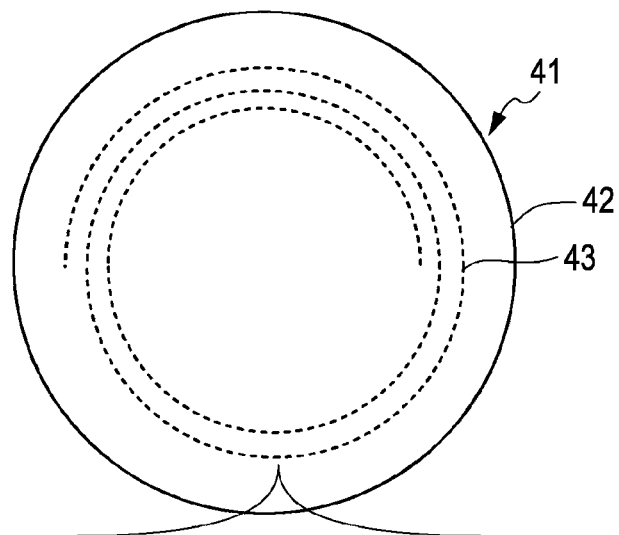
FIG. 21A is a plan view showing an example of a configuration of a disk master for preparing an optical element.
Figure 21B:
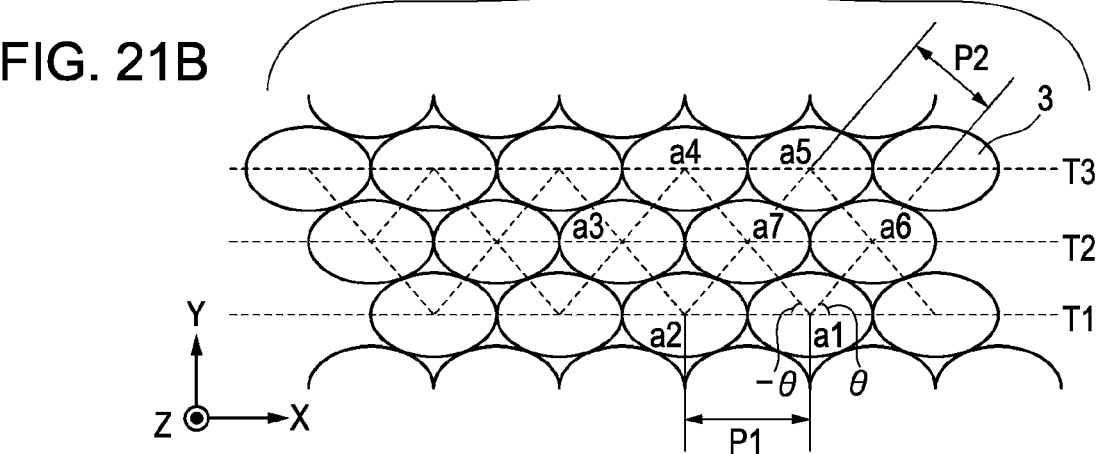
FIG. 21B is a plan view showing an example of a configuration of the disk master for preparing an optical element.

FIGS. 21A and 21B show an example of a configuration of a disk master for preparing the optical element having the configuration described above. As shown in FIG. 21A, a disk master 41 has a configuration in which a large number of structures 43 which are recesses are arranged on a surface of a disk-shaped master 42. These structures 43 are periodically and two-dimensionally arranged at a pitch equal to or smaller than the wavelength band of light under the operating environment of the optical element 1, for example, at a pitch substantially the same as the wavelength of visible light. The structures 43 are arranged on concentric or spiral-shaped tracks, for example.

The configuration other than the above-described configuration of the disk master 41 is the same as that of the roll master 11 of the first embodiment. Therefore, a description thereof is omitted.

[Method for Producing Optical Element]

First, an exposure apparatus for preparing the disk master 41 having the above-described configuration will be described with reference to FIG. 22.

A moving optical table 32 is provided with a beam expander 33, a mirror 38, and an objective lens 34. A laser beam 15 led to the moving optical table 32 is shaped into a desired beam shape with the beam expander 33 and is then applied to a resist layer on a disk-shaped master 42 through the mirror 38 and the objective lens 34. The master 42 is placed on a turntable 36 connected to a spindle motor 35. Subsequently, an exposure step of the resist layer is conducted by intermittently irradiating the resist layer on the master 42 with the laser beam 15 while the master 42 is rotated and, in addition, the laser beam 15 is moved in a radial direction of the rotation of the master 42. The formed latent images each have a substantially elliptical shape having a major axis extending in the circumferential direction. The movement of the laser beam 15 is conducted by a movement of the moving optical table 32 in the direction indicated by an arrow R.

Figure 22:
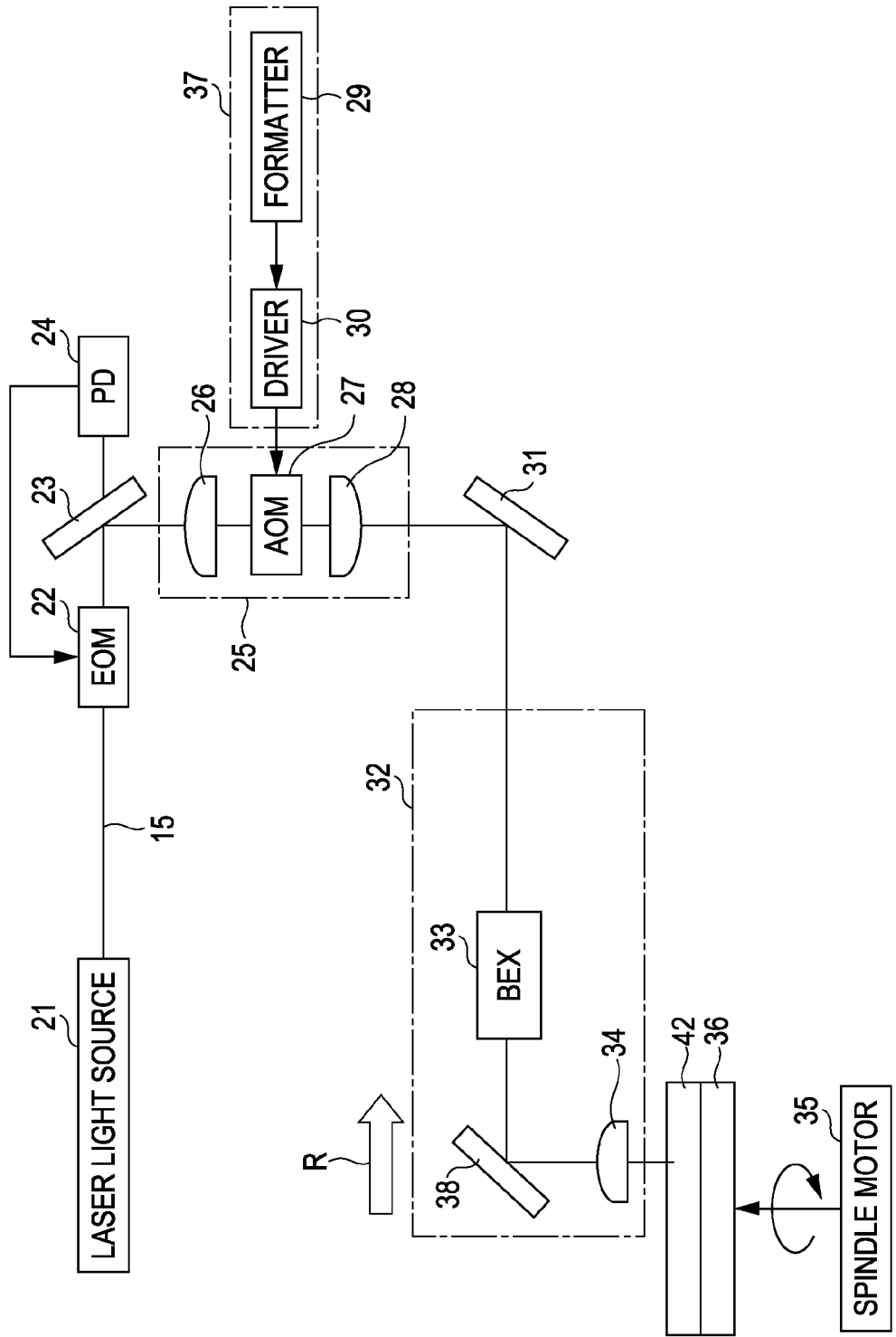
FIG. 22 is a schematic diagram showing an example of a configuration of a disk master exposure apparatus.

The exposure apparatus shown in FIG. 22 includes a control mechanism 37 for forming latent images in the resist layer, the latent images corresponding to the two-dimensional pattern of the hexagonal lattice pattern or quasi-hexagonal lattice pattern shown in FIG. 20B. The control mechanism 37 includes a formatter 29 and a driver 30. The formatter 29 is provided with a polarity inversion unit. This polarity inversion unit controls the irradiation timing of the laser beam 15 applied to the resist layer. The driver 30 controls an acousto-optic modulator (AOM) 27 in response to an output from the polarity inversion unit.

The control mechanism 37 synchronizes intensity modulation of the laser beam 15 by the AOM 27, the driving rotational speed of the spindle motor 35, and the moving speed of the moving optical table 32 in each track so that the two-dimensional pattern of the latent image is spatially linked. The master 42 is rotated while being controlled at a constant angular velocity (CAV). Patterning is performed at an appropriate number of rotations of the master 42, the number being determined by the spindle motor 35, an appropriate frequency modulation of the laser intensity, the frequency modulation being performed by the AOM 27, and an appropriate feed pitch of the laser beam 15, the feed pitch being determined by the moving optical table 32. Thus, latent images having a hexagonal lattice pattern or a quasi-hexagonal lattice pattern are formed in the resist layer.

Furthermore, control signals of the polarity inversion unit are gradually changed so that the spatial frequency (which is a pattern density of the latent images, P1: 330 nm and P2: 300 nm, P1: 315 nm and P2: 275 nm, or P1: 300 nm and P2: 265 nm) becomes uniform. More specifically, exposure is performed while the irradiation period of the laser beam 15 on the resist layer is changed in each track, and frequency modulation of the laser beam 15 is performed in the control mechanism 37 so that P1 is about 330 nm (315 nm, or 300 nm) in each track T. Specifically, modulation control is performed so that the irradiation period of the laser beam becomes short as the position of a track is away from the center of the disk-shaped master 42. Consequently, a nanopattern, the spatial frequency of which is uniform over the entire surface of a substrate, can be formed.

An example of a method for producing the optical element of the third embodiment will now be described.

First, a disk master 41 is prepared as in the first embodiment except that a resist layer formed on a disk-shaped master is exposed using the exposure apparatus having the above-described configuration. Next, this disk master 41 is brought into close contact with a base 2 such as an acrylic sheet to which an ultraviolet-curable resin is applied. Ultraviolet light is applied to cure the ultraviolet-curable resin, and the base 2 is then detached from the disk master 41. Thus, a disk-shaped optical element 1 in which a plurality of structures 3 are arranged on a front surface (first main surface) is obtained. Next, a light-absorbing layer 4 is formed on a back surface (second main surface) of the optical element 1. Next, an optical element 1 having a certain shape such as a rectangular shape is cut from the disk-shaped optical element 1. Thus, a target optical element 1 is prepared.

According to this third embodiment, an optical element 1 for which productivity is high and which has good anti-reflection characteristics can be obtained as in the case where the structures 3 are arranged in a straight line.

Figure 23A:
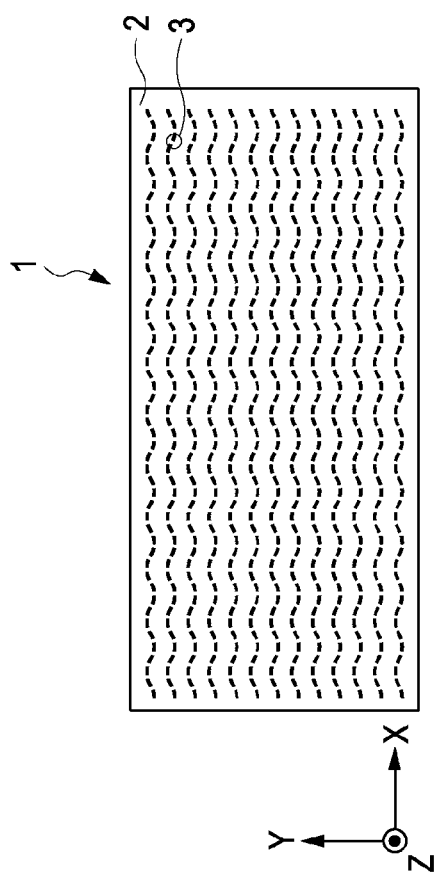
FIG. 23A is a schematic plan view showing an example of a configuration of an optical element according to a fourth embodiment.
Figure 23B:
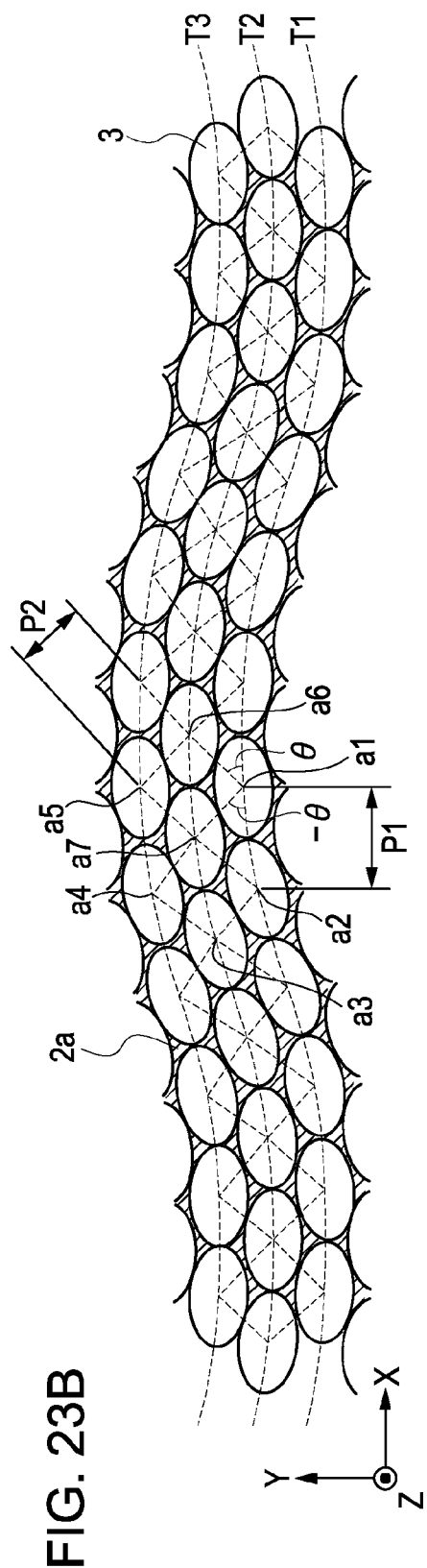
FIG. 23B is an enlarged plan view showing a part of the optical element shown in FIG. 23A.

Fourth Embodiment (An example in which structures are arranged in a meandering manner: refer to FIGS. 23A and 23B)

FIG. 23A is a schematic plan view showing an example of a configuration of an optical element according to a fourth embodiment. FIG. 23B is an enlarged plan view showing a part of the optical element shown in FIG. 23A.

An optical element 1 according to the fourth embodiment differs from that of the first embodiment in that structures 3 are arranged on meandering tracks (hereinafter referred to as "wobble tracks"). The wobbles of respective tracks on a base 2 are preferably synchronized. That is, the wobbles are preferably synchronized wobbles. By synchronizing the wobbles in this manner, a unit cell shape of a hexagonal lattice or a quasi-hexagonal lattice is maintained, so that a high filling factor can be maintained. Examples of the waveform of the wobble tracks include sine waves and triangular waves. The waveform of the wobble tracks is not limited to a periodic waveform and may be an aperiodic waveform. The wobble amplitude of the wobble tracks is selected to be about ±10 μm, for example.

In this fourth embodiment, the configuration other than the above-described configuration is the same as that of the first embodiment.

According to the fourth embodiment, since the structures 3 are arranged on the wobble tracks, the generation of unevenness in the appearance can be suppressed.

Fifth Embodiment (An example in which recessed structures are formed on a front surface of a base: refer to FIGS. 24A to 24D)

Figure 24A:
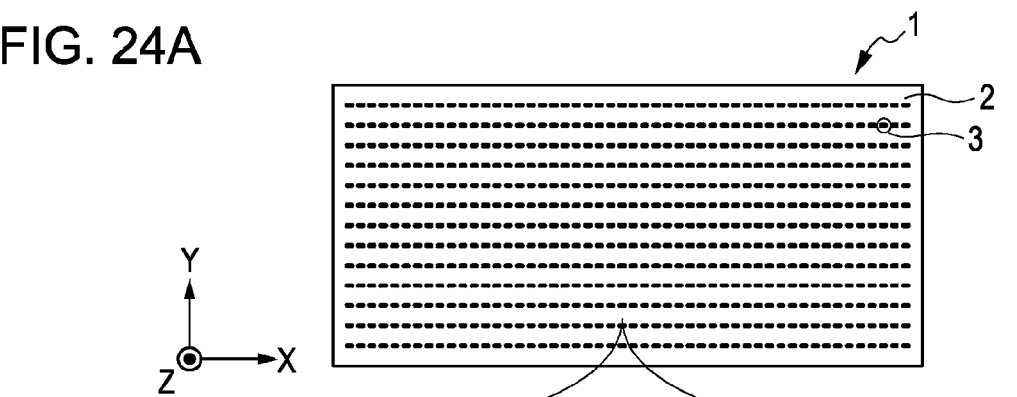
FIG. 24A is a schematic plan view showing an example of a configuration of an optical element according to a fifth embodiment.
Figure 24B:
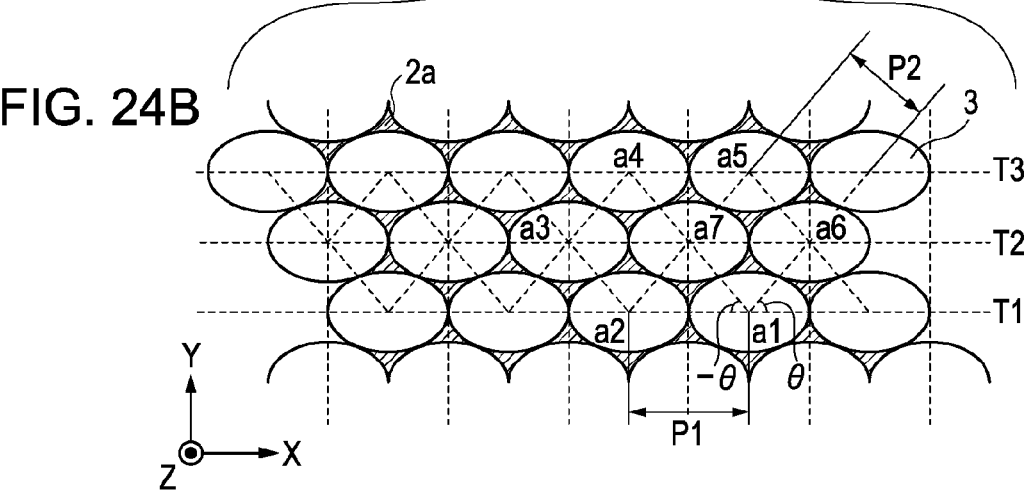
FIG. 24B is an enlarged plan view showing a part of the optical element shown in FIG. 24A.
Figure 24C:
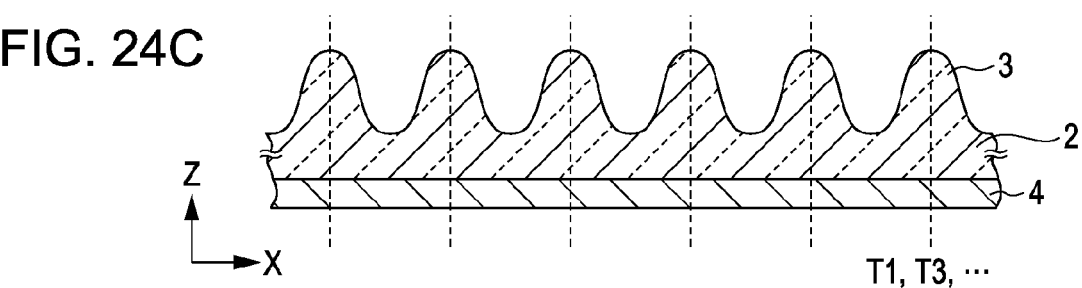
FIG. 24C is a cross-sectional view taken along tracks T1, T3, . . .
Figure 24D:
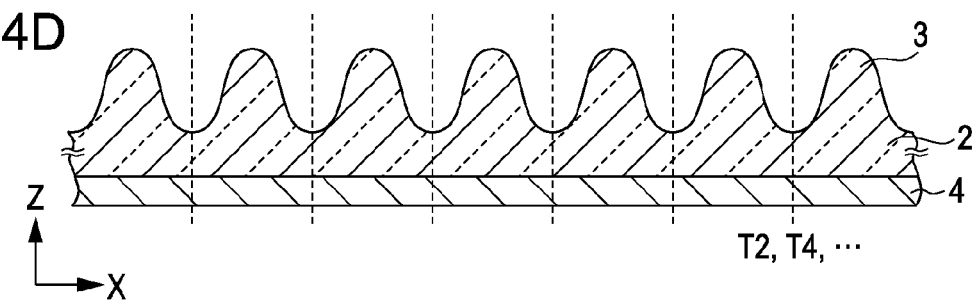
FIG. 24D is a cross-sectional view taken along tracks T2, T4, . . .
Figure 25:
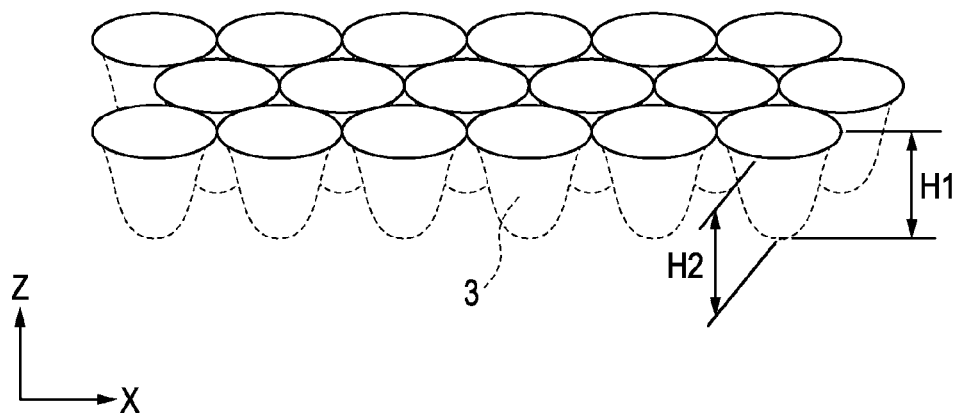
FIG. 25 is an enlarged perspective view showing a part of the optical element shown in FIG. 24A.

FIG. 24A is a schematic plan view showing an example of a configuration of an optical element according to a fifth embodiment. FIG. 24B is an enlarged plan view showing a part of the optical element shown in FIG. 24A. FIG. 24C is a cross-sectional view taken along tracks T1, T3, . . . in FIG. 24B. FIG. 24D is a cross-sectional view taken along tracks T2, T4, . . . in FIG. 24B. FIG. 25 is an enlarged perspective view showing a part of the optical element shown in FIG. 24A.

An optical element 1 of the fifth embodiment differs from the optical element 1 of the first embodiment in that a large number of structures 3 which are recesses are arranged on a front surface of a base. The shape of each of the structures 3 is a recessed shape obtained by inverting the projecting shape of each of the structures 3 in the first embodiment. Note that when the structures 3 are composed of recesses as described above, an opening portion of each of the structures 3 which are recesses (an inlet portion of each of the recesses) is defined as a lower portion, and the lowermost portion (the deepest portion of each of the recesses) of the base 2 in the depth direction is defined as a top portion. That is, the top portion and the lower portion are defined using the structures 3, which are unsubstantial spaces. Furthermore, in the fifth embodiment, since the structures 3 are recesses, the height H of the structures 3, for example, in formula (1) corresponds to the depth H of the structures 3.

In this fifth embodiment, the configuration other than the above-described configuration is the same as that of the first embodiment.

In the fifth embodiment, since the shape of the projecting structures 3 in the first embodiment is inverted to form the shape of the recesses, the same advantages as those of the first embodiment can be achieved.

Figure 26:
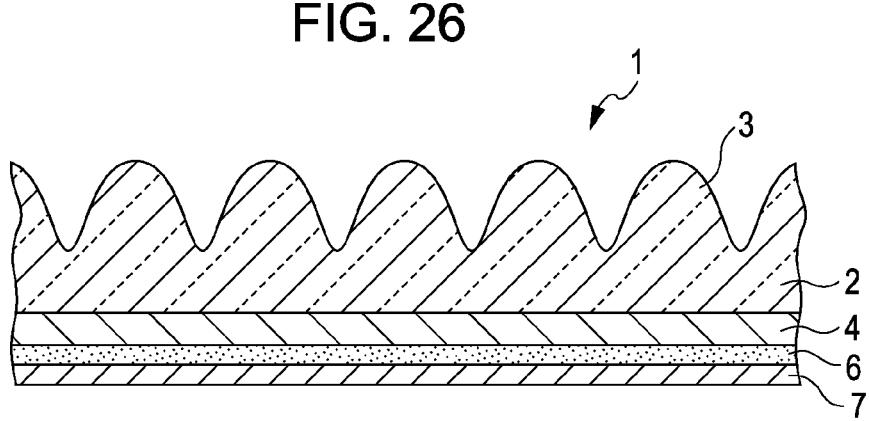
FIG. 26 is a cross-sectional view showing an example of a configuration of an optical element according to a sixth embodiment.

Sixth Embodiment (An example in which an optical element includes an adhesive layer: refer to FIG. 26)

FIG. 26 is a cross-sectional view showing an example of a configuration of an optical element according to a sixth embodiment. An optical element 1 according to the sixth embodiment differs from that of the first embodiment in that an adhesive layer 6 is further provided on the light-absorbing layer 4. The optical element 1 may further optionally include a release layer 7, such as a release sheet, disposed on the adhesive layer 6. The adhesive layer 6 contains an adhesive as a main component. For example, typical adhesives in the technical field of optical sheets can be used as the adhesive. Note that, in this specification, adhesives such as pressure-sensitive adhesives (PSAs) are also considered as one type of adhesive.

In this sixth embodiment, the optical element 1 can be easily bonded to an adherend such as an optical instrument, e.g. a camera, with the adhesive layer 6 therebetween. In addition, when the release layer 7 is further provided on the adhesive layer 6, handling of the optical element 1 becomes easy.

Figure 27A:
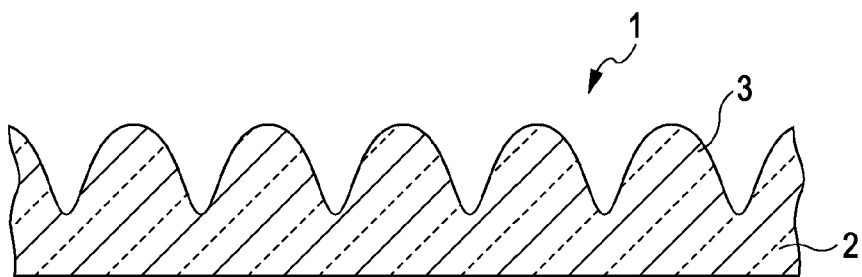
FIGS. 27A to 27C are cross-sectional views showing a first configuration example to a third configuration example, respectively, of optical elements according to a seventh embodiment.
Figure 27B:
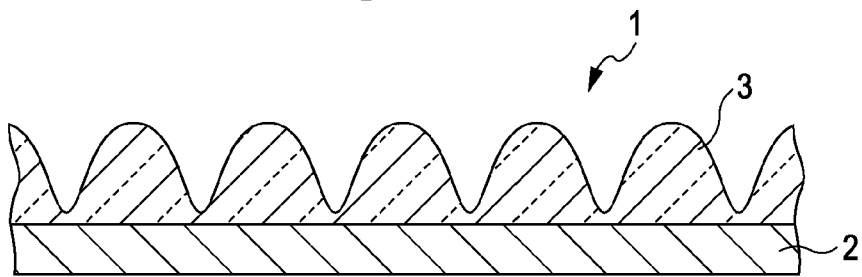
Figure 27C:
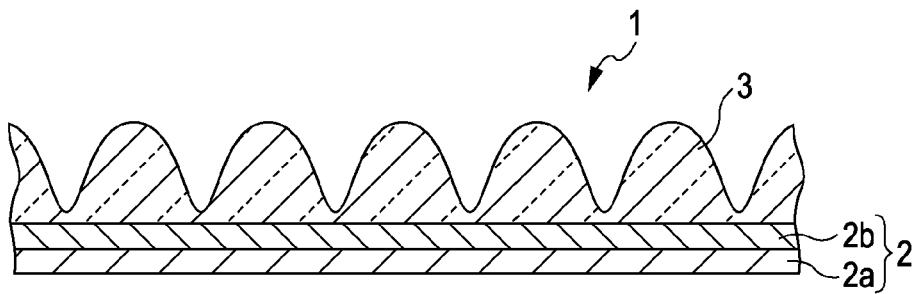

Seventh Embodiment (An example in which an optical element itself has a light-absorbing property: refer to FIGS. 27A to 27C)

An optical element 1 of a seventh embodiment differs from that in the first embodiment in that the base 2 and/or the structures 3 contain a black colorant such as carbon black instead of the light-absorbing layer 4, and have a light-absorbing property.

FIG. 27A is a cross-sectional view showing a first configuration example of an optical element according to the seventh embodiment. In an optical element 1, as shown in FIG. 27A, a base 2 and structures 3 are integrally formed, and a black colorant is incorporated in both the base 2 and the structures 3. Accordingly, both the base 2 and the structures 3 have a light-absorbing property.

FIG. 27B is a cross-sectional view showing a second configuration example of an optical element according to the seventh embodiment. In an optical element 1, as shown in FIG. 27B, a base 2 and structures 3 are separately formed, and the base 2 and/or the structures 3 contain a black colorant and have a light-absorbing property. From the standpoint of reducing the reflectivity, preferably, only the base 2 contains a black colorant and has a light-absorbing property whereas the structures 3 are transparent.

FIG. 27C is a cross-sectional view showing a third configuration example of an optical element according to the seventh embodiment. In an optical element 1, as shown in FIG. 27C, a base 2 and structures 3 are separately formed, and the base 2 is a laminate. This laminate has a stacked structure in which two or more layers are stacked. At least one layer of the two or more layers contains a black colorant and has a light-absorbing property. The structures 3 may also contain a black colorant and have a light-absorbing property. However, as described above, only the base 2 preferably contains a black colorant and has a light-absorbing property.

In this seventh embodiment, since the optical element itself contains a black colorant and has a light-absorbing property, the formation of the light-absorbing layer 4 can be omitted. Accordingly, since the light-absorbing layer formation step can be omitted, productivity can be improved. Furthermore, the thickness of the optical element 1 can be reduced.

Figure 28:
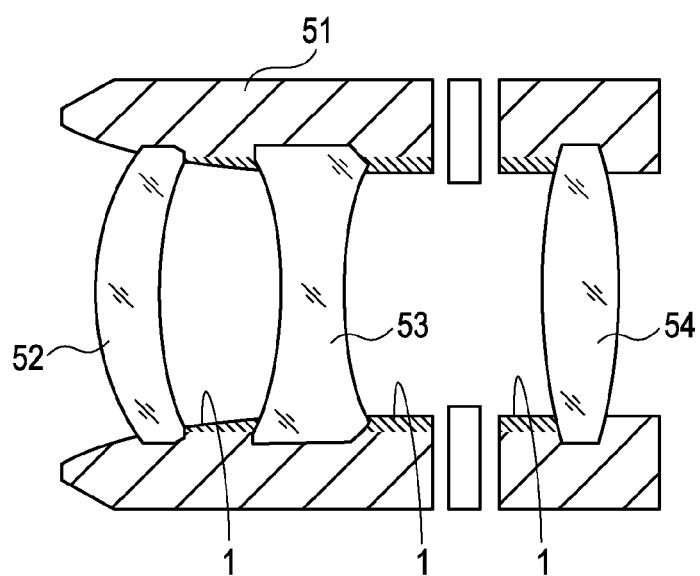
FIG. 28 is a cross-sectional view showing an example of a configuration of a lens barrel according to an eighth embodiment.

Eighth Embodiment (An example in which an optical element is applied to a lens barrel: refer to FIG. 28)

FIG. 28 is a cross-sectional view showing an example of a configuration of a lens barrel according to an eighth embodiment. As shown in FIG. 28, a lens barrel 51 includes an optical element 1 therein. Examples of a specific position in the lens barrel in which the optical element 1 is provided include an inner circumferential surface of the lens barrel and a surface of a component provided in the lens barrel. One or more types of the optical elements described in the first to seventh embodiments can be used as the optical element 1, and preferably, the optical element 1 is appropriately selected and used in accordance with desired anti-reflection characteristics and the like. For example, on the inner circumferential surface of the lens barrel 51, the optical element 1 is provided on a portion between a lens 52 and a lens 53, a portion between the lens 53 and a lens 54, and the like. The optical element 1 and the lens barrel 51 may be integrally formed.

In this eighth embodiment, since the optical element 1 is provided on an inner circumferential surface of a lens barrel, a surface of a component provided in a lens barrel, or the like, the amount of reflection of light at the inner circumferential surface of the lens barrel, the surface of the component provided in the lens barrel, or the like can be reduced. Accordingly, generation of ghosts and flare in an image can be suppressed, thus suppressing a decrease in the contrast and the like.

EXAMPLES

The present application will now be specifically described by way of Examples and Test Examples, but the present application is not limited to only these Examples and Test Examples.

1. Examination of Reflection Characteristics Using Actually Prepared Samples

Example 1

First, a glass roll master having an outer diameter of 126 mm was prepared, and a film of a resist was formed on a surface of the glass master as follows. Specifically, a photoresist was diluted to 1/10 with a thinner, and the diluted resist was then applied onto the columnar surface of the glass roll master by dipping so as to have a thickness of about 70 nm to form a film of the resist. Next, the glass roll master serving as a recording medium was transferred to the roll master exposure apparatus shown in FIG. 14, and the resist was exposed, thereby patterning latent images in the resist, the latent images being arranged in the form of a single spiral and forming a quasi-hexagonal lattice pattern in three adjacent tracks.

Specifically, an area where the quasi-hexagonal lattice pattern was to be formed was irradiated with a laser beam of 0.50 mW/m, which was a power with which exposure to the surface of the glass roll master could be performed, thus forming a recess-shaped quasi-hexagonal lattice pattern. The thickness of the resist in a row direction of track rows was about 60 nm, and the thickness of the resist in a direction in which tracks extend was about 50 nm.

Next, a development treatment was performed on the resist formed on the glass roll master to dissolve the resist located in the exposed portions, thus conducting development. Specifically, the undeveloped glass roll master was placed on a turntable of a developing device (not shown), and a developer was dropped on the surface of the glass roll master while rotating the turntable in whole, thus developing the resist on the surface. Accordingly, a resist glass master having a resist layer in which openings were formed in a quasi-hexagonal lattice pattern was prepared.

Next, plasma etching was conducted in a $CHF_3$ gas atmosphere using a roll etching apparatus. Consequently, on the surface of the glass roll master, the etching proceeded in only portions of the quasi-hexagonal lattice pattern exposed from the resist layer, and the other portions were not etched because the photoresist functioned as a mask. Thus, recesses each having an elliptical cone shape were obtained. The amount (depth) of etching in the pattern of this case was changed by changing the etching time. Lastly, the photoresist was completely removed by $O_2$ ashing to prepare a moth-eye glass roll master having a recessed quasi-hexagonal lattice pattern. The depth of each of the recesses in the row direction was deeper than the depth of each of the recesses in the direction in which the tracks extend.

Next, an acrylic sheet or the like to which an ultraviolet-curable resin was applied was brought into close contact with the moth-eye glass roll master, and was then detached while conducting curing by applying ultraviolet light. Accordingly, an optical sheet in which a plurality of structures were arranged on a front surface thereof was prepared. Next, a black pressure-sensitive adhesive sheet (light-absorbing layer) was bonded to a back surface of the optical sheet to prepare an optical sheet having the light-absorbing layer (moth-eye duplicate black sheet).

Example 2

A resist layer was patterned by adjusting the frequency of the polarity inversion formatter signal, the number of rotations of the roll, and an appropriate feed pitch in each track. Thus, a quasi-hexagonal lattice pattern was recorded in the resist layer. An optical sheet having a light-absorbing layer was prepared as in Example 1 except for this.

Example 3

A resist layer was patterned by adjusting the frequency of the polarity inversion formatter signal, the number of rotations of the roll, and an appropriate feed pitch in each track. Thus, a quasi-tetragonal lattice pattern was recorded in the resist layer. An optical sheet having a light-absorbing layer was prepared as in Example 1 except for this.

Example 4

A resist layer was patterned by adjusting the frequency of the polarity inversion formatter signal, the number of rotations of the roll, and an appropriate feed pitch in each track. Thus, a quasi-tetragonal lattice pattern was recorded in the resist layer. An optical sheet having a light-absorbing layer was prepared as in Example 1 except for this.

(Evaluation of Shape)

Irregular surfaces of the optical elements (i.e., optical sheets) of Examples 1 to 4 prepared as described above, the optical elements each having a light-absorbing layer, were observed with an atomic force microscope (AFM). The heights of the structures of the respective Examples were determined from cross-sectional profiles of the AFM. The results are shown in Tables 1 and 2.

TABLE 1

|  | Example 2 | Example 1 |
|---|---|---|
| Depth in the circumferential direction | 243 nm | 323 nm |
| Depth in the radial direction | 271 nm | 334 nm |
| Period in the circumferential direction | 270 nm | 290 nm |
| Period in the direction of 60 degrees with respect to the circumferential direction | 260 nm | 260 nm |
| Average period | 263 nm | 270 nm |
| Aspect ratio | 1.03 | 1.23 |

TABLE 2

|  | Example 3 | Example 4 |
|---|---|---|
| Depth in the direction of 45 degrees with respect to the circumferential direction | 248 nm | 208 nm |
| Depth in the radial direction | 275 nm | 214 nm |
| Period in the circumferential direction | 340 nm | 310 nm |
| Track period | 170 nm | 170 nm |
| Period | 240 nm | 230 nm |
| Aspect ratio | 1.15 | 0.93 |

The moth-eye shapes of the optical elements in Examples 1 and 2 are projecting truncated elliptical cones (elliptical cones) arranged in a quasi-hexagonal lattice pattern. From the measurement of the cross-sectional shape with the AFM, it is found that the height of the structures in a direction in which the tracks extend is smaller than the height of the structures in a direction of about 60 degrees with respect to the direction in which the tracks extend. In addition, since the heights of the structures in directions other than the direction in which the tracks extend are substantially the same as the height of the structures in the direction of about 60 degrees with respect to the direction in which the tracks extend, the height of the structures is represented by the height in the direction of about 60 degrees with respect to the direction in which the tracks extend.

The moth-eye shapes of the optical elements in Examples 3 and 4 are projecting truncated elliptical cones (elliptical cones) arranged in a quasi-tetragonal lattice pattern. From the measurement of the cross-sectional shape with the AFM, it is found that the height of the structures in a direction of about 45 degrees with respect to a direction in which tracks extend is smaller than the height of the structures in a row direction of the tracks. In addition, since the heights of the structures in directions other than the direction of about 45 degrees with respect to the direction in which the tracks extend are substantially the same as the height of the structures in the row direction of the tracks, the height of the structures is represented by the height in the row direction of the tracks.

(Evaluation of Reflectivity)

The reflectivity of the optical elements each having a light-absorbing layer of Examples 1 to 4 were evaluated with an evaluation apparatus (V-550) manufactured by JASCO Corporation. FIGS. 29A to 30B show the wavelength dependence and the incident angle dependence of the reflectivity in the optical elements of Examples 1 to 4, respectively.

Figure 29A:
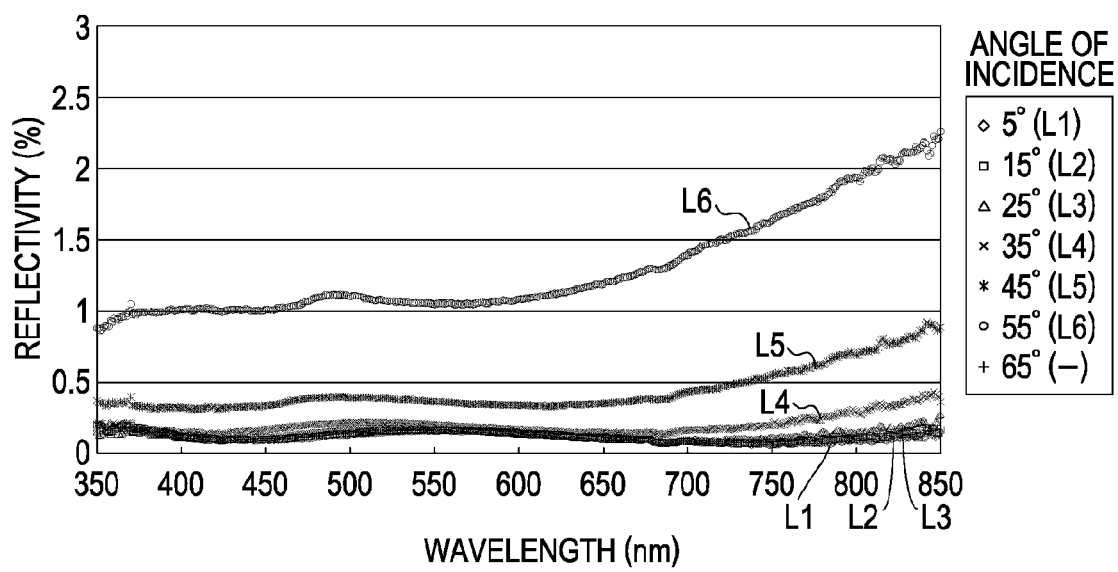
FIG. 29A is a graph showing reflection characteristics of an optical sheet of Example 1.
Figure 29B:
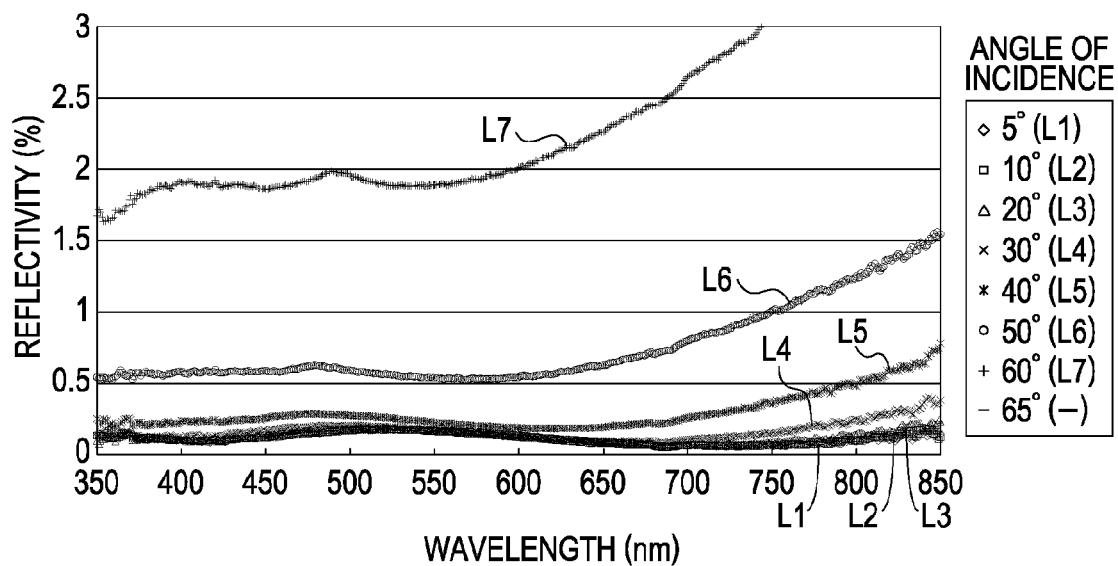
FIG. 29B is a graph showing reflection characteristics of an optical sheet of Example 2.

The following is seen from FIGS. 29A and 29B.

In the optical sheets of Examples 1 and 2, there is a wavelength dependence of the reflectivity. However, the reflectivities of these samples are sufficiently small values considering that the reflectivity of a base that does not have a moth-eye pattern is about 4.5%, and the average reflectivity of these samples in the range from UV light to visible light (wavelength: 350 to 750 nm, incident angle: up to 35 degrees) is about 0.10%. Even at an incident angle of 40 degrees and 45 degrees, the average reflectivity is in the range of about 0.3% to 0.4%, and thus a sufficient anti-reflection effect can be obtained.

Accordingly, in the quasi-hexagonal lattice pattern optical sheets in which the depth between structures is shallow in the circumferential direction (i.e., a direction of the long axis of the sheet), a sufficient anti-reflection effect can be obtained.

Furthermore, in the optical sheets of Examples 1 and 2, in which a plurality of truncated elliptical cones (elliptical cones) each having a projecting shape are arranged in a quasi-hexagonal lattice pattern and the aspect ratio is set to be 1.03 to 1.23, sufficient anti-reflection characteristics can be obtained.

In addition, from the evaluation results of the shape, it was confirmed that recessed elliptical cone-shaped grooves were formed in the moth-eye quartz master.

Figure 30A:
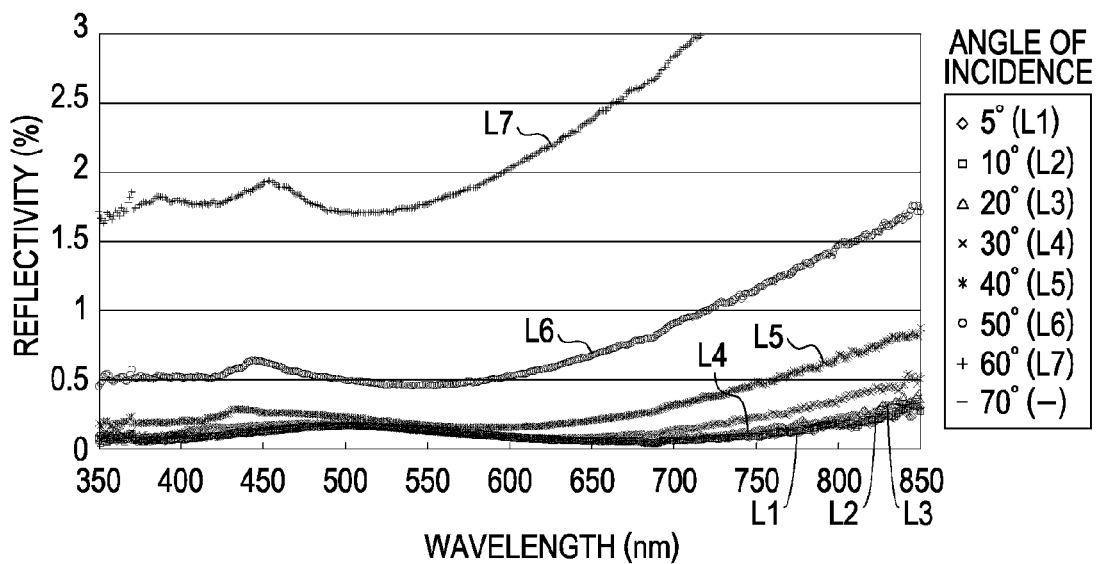
FIG. 30A is a graph showing reflection characteristics of an optical sheet of Example 3.
Figure 30B:
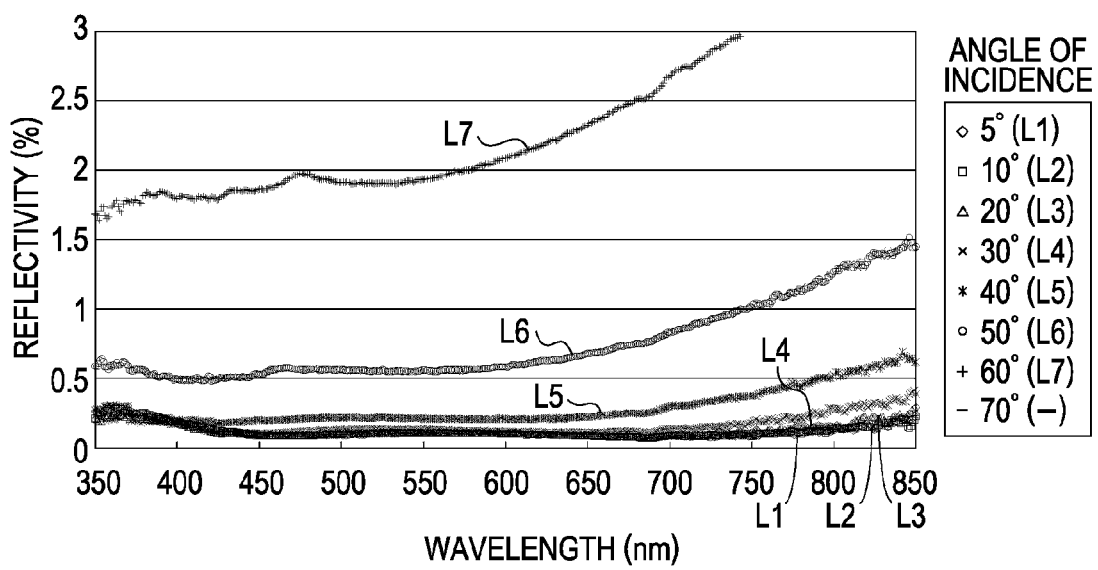
FIG. 30B is a graph showing reflection characteristics of an optical sheet of Example 4.

The following is seen from FIGS. 30A and 30B.

The average reflectivity of the optical sheets of Examples 3 and 4 in the visible light range (wavelength: 400 to 750 nm, incident angle: up to 35 degrees) is about 0.10%, which is a sufficiently small value. Even at incident angles of 40 degrees and 45 degrees, the average reflectivity is in the range of about 0.3% to 0.5%, and thus a sufficient anti-reflection effect can be obtained. Even at an incident angle of 40 degrees, the average reflectivity is about 0.4%, and thus a sufficient anti-reflection effect can be obtained. The angular dependence is also sufficiently suppressed to be small.

Accordingly, in the quasi-tetragonal lattice pattern optical sheets in which the depth between structures is shallow in the direction of about 45 degrees with respect to the circumferential direction (i.e., a direction of 45 degrees with respect to the long axis of the sheet), a sufficient anti-reflection effect can be obtained.

Furthermore, in the optical sheets of Examples 3 and 4, in which a plurality of truncated elliptical cones (elliptical cones) each having a projecting shape are arranged in a quasi-tetragonal lattice pattern and the aspect ratio is set to be 0.93 to 1.15, sufficient anti-reflection characteristics can be obtained.

In addition, from the evaluation results of the shape, it was confirmed that recessed elliptical cone-shaped grooves were formed in the moth-eye quartz master.

2. Examination of the Relationship Between the Absorption Coefficient and Reflection Characteristics by a Simulation Test Example 1

Figure 31A:
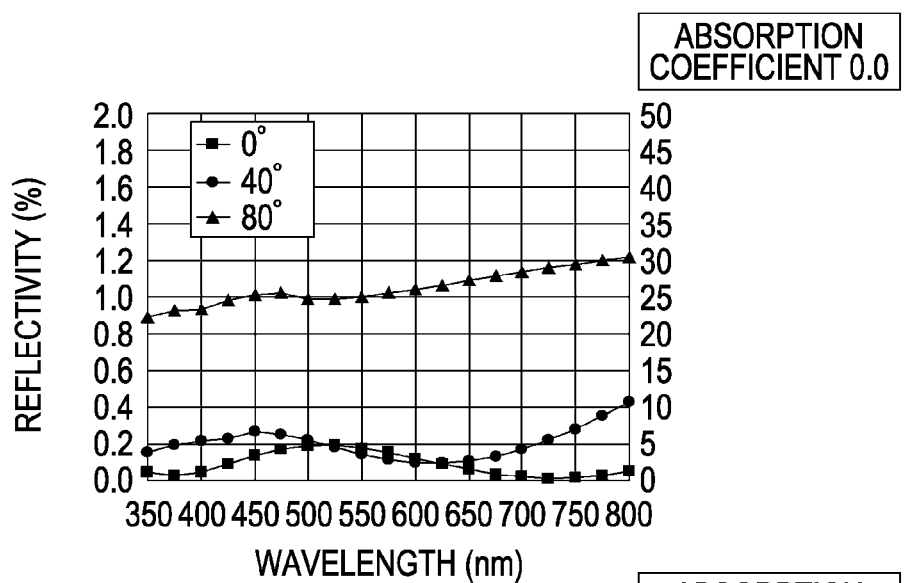
FIG. 31A is a graph showing reflection characteristics of Test Example 1.

First, a plurality of structures were arranged on a flat surface, and the reflectivities when light was incident from directions of 0°, 40°, and 80° with respect to the normal of this flat surface were determined by rigorous coupled-wave analysis (RCWA). The results are shown in FIG. 31A.

The conditions for the simulation are described below.
Shape of structures: Hanging bell shape
Arrangement of structures: Hexagonal lattice
Absorption coefficient of structures: 0.0
Height of structures: 300 nm
Pitch P1 and pitch P2: 250 nm
Aspect ratio: 1.2

Test Example 2

The reflectivities were determined by RCWA as in Test Example 1 except that the absorption coefficient of the structures was set to 0.1. The results are shown in FIG. 31B.

Test Example 3

The reflectivities were determined by RCWA as in Test Example 1 except that the absorption coefficient of the structures was set to 1.0. The results are shown in FIG. 31C.

Figure 31B:
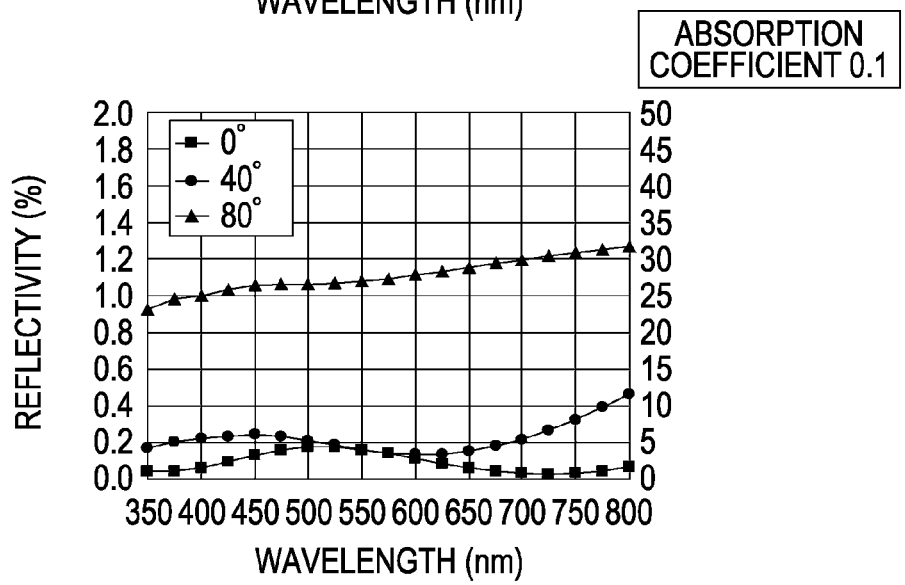
FIG. 31B is a graph showing reflection characteristics of Test Example 2.
Figure 31C:
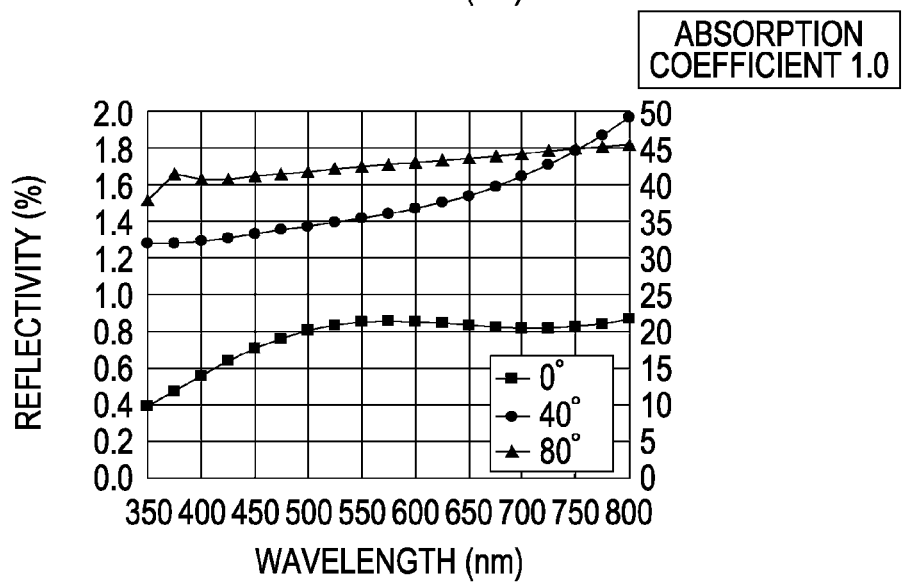
FIG. 31C is a graph showing reflection characteristics of Test Example 3.

The following is seen from the simulation results shown in FIGS. 31A to 31C.

Even when the shape and the arrangement of the structures are the same, reflection characteristics are different depending on the absorption coefficient of the structures. Specifically, with an increase in the absorption coefficient of the structures, the reflectivity tends to increase, and in particular, the reflectivity at the long-wavelength side tends to increase in the range of 350 to 800 nm.

Accordingly, from the standpoint of decreasing the reflectivity, it is desirable that a light-absorbing property is imparted by incorporating a black colorant in a base rather than that a light-absorbing property is imparted by incorporating a black colorant in the structures.

3. Examination of the Relationship Among a Filling Factor, the Ratio of the Diameter, and Reflection Characteristics by a Simulation

Test Example 4

Figure 32A:
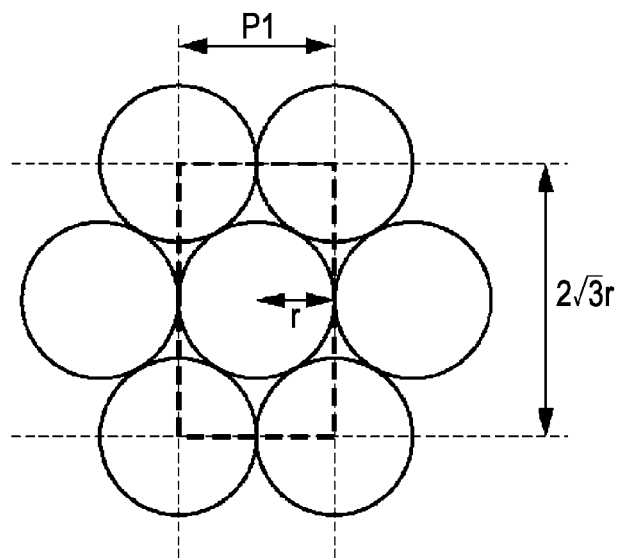
FIG. 32A is a view for explaining a filling factor when structures are arranged in a hexagonal lattice pattern.

FIG. 32A is a view for explaining a filling factor when structures are arranged in a hexagonal lattice pattern. In the case where the structures are arranged in the hexagonal lattice pattern as shown in FIG. 32A, filling factors when the ratio (($2r/P1$)×100) (wherein P1 represents an arrangement pitch of structures in the same track and r represents the radius of the bottom surface of each of the structures) was changed were determined by formula (5) below.

$$\text{Filling factor} = (S(\text{hex.})/S(\text{unit})) \times 100 \quad (5)$$

Area of unit cell: $S(\text{unit}) = 2r \times (2\sqrt{3})r$
Area of bottom surfaces of structures present in unit cell: $S(\text{hex.}) = 2 \times \lambda r^2$
(However, when $2r > P1$, these areas are determined on the basis of the drawing.)
For example, when the arrangement pitch P1=2 and the radius r of the bottom surface of each of the structures=1, S(unit), S(hex.), the ratio (($2r/P1$)×100), and the filling factor are the values below.
S(unit)=6.9282
S (hex.)=6.28319
($2r/P1$)×100=100.0%
Filling factor=(S(hex.)/S(unit))×100=90.7%

Table 3 shows the relationship between the filling factor determined by formula (5) above and the ratio (($2r/P1$)×100).

TABLE 3

| ($2r/P1$) × 100 | Filling factor |
|---|---|
| 115.4% | 100.0% |
| 100.0% | 90.7% |
| 99.0% | 88.9% |
| 95.0% | 81.8% |
| 90.0% | 73.5% |
| 85.0% | 65.5% |
| 80.0% | 58.0% |
| 75.0% | 51.0% |

Test Example 5

Figure 32B:
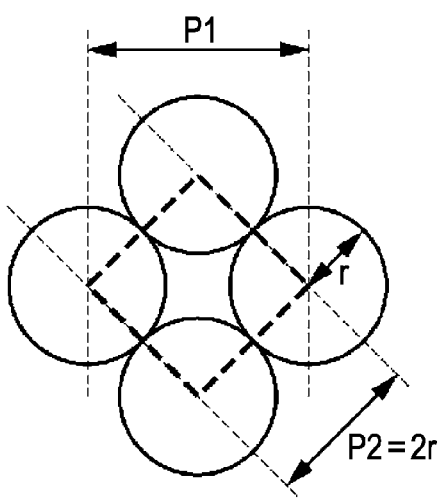
FIG. 32B is a view for explaining a filling factor when structures are arranged in a tetragonal lattice pattern.

FIG. 32B is a view for explaining a filling factor when structures are arranged in a tetragonal lattice pattern. In the case where the structures are arranged in the tetragonal lattice pattern as shown in FIG. 32B, filling factors when the ratio (($2r/P1$)×100) and the ratio (($2r/P2$)×100) (wherein P1 represents an arrangement pitch of structures in the same track, P2 represents an arrangement pitch in a direction of 45 degrees with respect to the tracks, and r represents the radius of the bottom surface of each of the structures) were changed were determined by formula (6) below.

$$\text{Filling factor} = (S(\text{tetra})/S(\text{unit})) \times 100 \quad (6)$$

Area of unit cell: $S(\text{unit}) = 2r \times 2r$
Area of bottom surfaces of structures present in unit cell: $S(\text{tetra}) = \pi r^2$
(However, when $2r > P1$, these areas are determined on the basis of the drawing.)
For example, when the arrangement pitch P2=2 and the radius r of the bottom surface of each of the structures=1, S(unit), S(tetra), the ratio (($2r/P1$)×100), the ratio (($2r/P2$)×100), and the filling factor are the values below.
S(unit)=4
S(tetra)=3.14159
($2r/P1$)×100=70.7%
($2r/P2$)×100=100.0%
Filling factor=(S(tetra)/S(unit))×100=78.5%

Table 4 shows the relationship among the filling factor determined by formula (6) above, the ratio (($2r/P1$)×100), and the ratio (($2r/P2$)×100).

In addition, the relationship between the arrangement pitch P1 and the arrangement pitch P2 of the tetragonal lattice is represented by $P1 = \sqrt{2} \times P2$.

TABLE 4

| ($2r/P1$) × 100 | ($2r/P2$) × 100 | Filling factor |
|---|---|---|
| 100.0% | 141.4% | 100.0% |
| 84.9% | 120.0% | 95.1% |
| 81.3% | 115.0% | 92.4% |
| 77.8% | 110.0% | 88.9% |
| 74.2% | 105.0% | 84.4% |
| 70.7% | 100.0% | 78.5% |
| 70.0% | 99.0% | 77.0% |
| 67.2% | 95.0% | 70.9% |
| 63.6% | 90.0% | 63.6% |
| 60.1% | 85.0% | 56.7% |
| 56.6% | 80.0% | 50.3% |
| 53.0% | 75.0% | 44.2% |

Test Example 6

Figure 33:
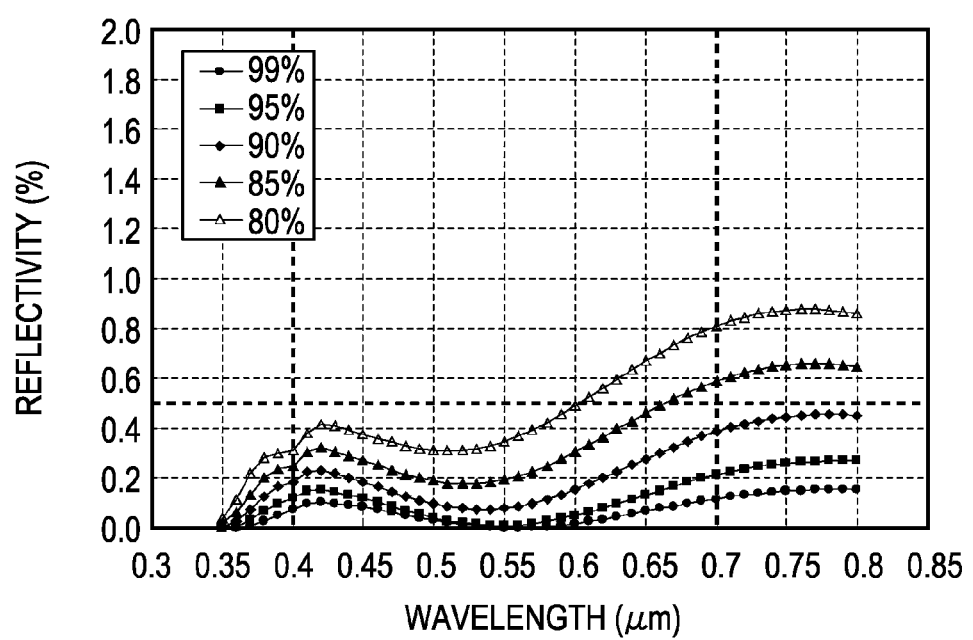
FIG. 33 is a graph showing the results of a simulation of Test Example 6.

The reflectivities were determined by an RCWA simulation under the conditions described below, while the ratio (($2r/P1$)×100) of the diameter $2r$ of the bottom surface of each of the structures to the arrangement pitch P1 was set to be 80%, 85%, 90%, 95%, and 99%. A graph of the results is shown in FIG. 33.

Shape of structures: Hanging bell shape
Polarization: Non-polarization
Refractive index: 1.48
Arrangement pitch P1: 320 nm
Height of structures: 415 nm
Aspect ratio: 1.30
Arrangement of structures: Hexagonal lattice Referring to FIG. 33, when the ratio (($2r/P1$)×100) is 85% or more, the average reflectivity R satisfies R<0.5% in the wavelength range (0.4 to 0.7 μm) of visible light, and a sufficient anti-reflection effect can be obtained. The filling factor of the bottom surface in this case is 65% or more. Furthermore, when the ratio (($2r/P1$)×100) is 90% or more, the average reflectivity R satisfies R<0.3% in the wavelength range of visible light. Thus, an anti-reflection effect with higher performance can be obtained. The filling factor of the bottom surface in this case is 73% or more. With an increase in the filling factor up to the upper limit of 100%, the performance also improves. When the structures overlap each other, a height from the lowest position is considered to be as the height of the structures. Furthermore, it was also confirmed that similar tendencies of the filling factor and the reflectivity were observed in a tetragonal lattice.

While embodiments and Examples of the present application have been specifically described, the present invention is not limited to the foregoing embodiments and Examples. Various changes can be made on the basis of the technical idea of the present application.

For example, the numerical values, shapes, materials, configurations, and the like described in the embodiments and Examples described above are merely exemplary, and other numerical values, shapes, materials, configurations, and the like, all of which are different from the above, may be used if necessary.

Furthermore, the configurations described above can be combined with each other according to an embodiment.

Furthermore, in the embodiments described above, the optical element 1 may further include a low-refractive-index layer disposed on the irregular surface having the structures 3 thereon. The low-refractive-index layer preferably contains, as a main component, a material having a refractive index lower than the materials of the base 2, the structures 3, and the protruding portions 5. Examples of the material of such a low-refractive-index layer include organic materials such as fluororesins and inorganic low-refractive-index materials such as LiF and $MgF_2$.

Furthermore, in the embodiments described above, the optical element may be produced by thermal transfer. Specifically, the following method may also be employed: A base containing a thermoplastic resin as a main component may be heated, and a stamp (mold) such as the roll master 11 or the disk master 41 may then be pressed onto the base that has been sufficiently soften by the heating to prepare the optical element 1.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element having an anti-reflection function, comprising:
    a base having a first main surface and a second main surface;
    a plurality of structures composed of projections or recesses and arranged on the first main surface at a fine pitch equal to or less than the wavelength of visible light for which the amount of reflection is to be reduced; and
    a light-absorbing layer that absorbs the light and that is disposed on the second main surface, the light-absorbing layer being bonded to the base with an adhesive layer, wherein the refractive index of the base is substantially the same as the reflective index of the adhesive layer such that reflection at an interface between the base and the adhesive layer can be suppressed,
    wherein the structures are arranged so as to form a plurality of rows of tracks on the first main surface of the base and form a hexagonal lattice pattern, a quasi-hexagonal lattice pattern, a tetragonal lattice pattern, or a quasi-tetragonal lattice pattern, and
    the structures each have an elliptical cone shape or a truncated elliptical cone shape, the major axis direction of which is a direction in which the tracks extend.

2. The optical element according to claim 1, wherein each of the tracks has a linear shape or a circular arc shape.

3. The optical element according to claim 1, wherein each of the tracks has a meandering shape.

4. The optical element according to claim 1, wherein each of the structures has a cone shape in which the slope of a top portion is moderate and the slope gradually becomes steeper from a central portion to a bottom portion.

5. The optical element according to claim 1,
    wherein the structures are arranged so as to form a plurality of rows of linear tracks and form a quasi-hexagonal lattice pattern, and
    a height or a depth of each of the structures in the direction in which the tracks extend is smaller than a height or a depth of each of the structures in a row direction of the tracks.

6. The optical element according to claim 1,
    wherein the structures are arranged so as to form a plurality of rows of linear tracks and form a tetragonal lattice pattern or a quasi-tetragonal lattice pattern, and
    a height or a depth of each of the structures in an arrangement direction that is slanted with respect to the direction in which the tracks extend is smaller than a height or a depth of each of the structures in the direction in which the tracks extend.

7. The optical element according to claim 1, wherein an arrangement pitch P1 of the structures in the same track is longer than an arrangement pitch P2 of the structures between two adjacent tracks.

8. The optical element according to claim 1,
    wherein the structures form a hexagonal lattice pattern or a quasi-hexagonal lattice pattern on the first main surface, and
    when an arrangement pitch of the structures in the same track is represented by P1 and an arrangement pitch of the structures between two adjacent tracks is represented by P2, the ratio P1/P2 satisfies the relationship $1.00 \leq P1/P2 \leq 1.1$ or $1.00 < P1/P2 \leq 1.1$.

9. The optical element according to claim 1,
    wherein the structures form a tetragonal lattice pattern or a quasi-tetragonal lattice pattern on the first main surface, and
    when an arrangement pitch of the structures in the same track is represented by P1 and an arrangement pitch of the structures between two adjacent tracks is represented by P2, the ratio P1/P2 satisfies the relationship $1.4 < P1/P2 \leq 1.5$.

10. An optical element having an anti-reflection function, comprising:
    a base having a first main surface and a second main surface; and
    a plurality of structures composed of projections or recesses and arranged on the first main surface at a fine pitch equal to or less than the wavelength of visible light for which the amount of reflection is to be reduced,
    wherein a light-absorbing layer is bonded to the base with an adhesive layer whose refractive index is substantially the same as the reflective index of the base such that reflection at an interface between the base and the adhesive layer can be suppressed,
    wherein the base and/or the structures have a property of absorbing the light,
    the structures are arranged so as to form a plurality of rows of tracks on the first main surface and form a hexagonal lattice pattern, a quasi-hexagonal lattice pattern, a tetragonal lattice pattern, or a quasi-tetragonal lattice pattern, and
    the structures each have an elliptical cone shape or a truncated elliptical cone shape, the major axis direction of which is a direction in which the tracks extend.

11. An optical instrument comprising the optical element according to any one of claims 1 to 9 and 10.

* * * * *